ANALOG-TO-DIGITAL CONVERTER

Filed Oct. 13, 1960 6 Sheets-Sheet 1

INVENTOR.
KARL HINRICHS
BY Louis J. Knobbe
ATTORNEY

Nov. 2, 1965 K. HINRICHS 3,216,001

ANALOG-TO-DIGITAL CONVERTER

Filed Oct. 13, 1960 6 Sheets-Sheet 2

INVENTOR.
KARL HINRICHS
BY
Louis J. Knobbe
ATTORNEY

ANALOG-TO-DIGITAL CONVERTER

Filed Oct. 13, 1960

6 Sheets-Sheet 3

INVENTOR.
KARL HINRICHS

BY Louis J. Knobbe
ATTORNEY

INVENTOR.
KARL HINRICHS
BY
Louis J. Knobbe
ATTORNEY

Nov. 2, 1965 K. HINRICHS 3,216,001

ANALOG-TO-DIGITAL CONVERTER

Filed Oct. 13, 1960 6 Sheets-Sheet 5

INVENTOR.

KARL HINRICHS

BY Louis J. Knobbe

ATTORNEY

INVENTOR.
KARL HINRICHS
BY
Louis J. Knobbe
ATTORNEY

United States Patent Office 3,216,001

Patented Nov. 2, 1965

3,216,001

ANALOG-TO-DIGITAL CONVERTER

Karl Hinrichs, Anaheim, Calif., assignor to Beckman Instruments, Inc., a corporation of California Filed Oct. 13, 1960, Ser. No. 62,379
22 Claims. (Cl. 340—347)

My invention relates to analog-to-digital converters, and more particularly to analog-to-digital converters of the electronic type in which an analog signal is converted to a coded digital signal, one digital symbol at a time.

A variable is deemed to be in analog form when the magnitude that represents its value is a continuous function of time. Often it is desirable to convert from this form of information to a series of numerical samples at selected time intervals for convenience, accuracy and speed in data handling computations. My invention converts such analog signals to digital signals at selected time intervals, the digital samples being a convenient form for input to digital computers or similar information processing devices. A variable is deemed to be in digital form when each time sample of the signal is represented by a series of magnitudes, each of which is permitted only two quantum states. Such digital samples may be encoded in any of a wide variety of electronic computer codes chosen on a basis of convenience, accuracy and reliability.

A very common and widely used analog-to-digital converter may conveniently be referred to as a "digit-at-a-time" converter, in which the analog signal during selected time intervals is quantized to a set of digital symbols such a "1" and "0," one symbol at a time. Ordinarily a converter of this type uses "selected subtraction." Commencing at a selected time, the analog signal is compared with assembled reference values or standards weighted according to a predetermined number system. The analog signal magnitude at that time is compared with the largest reference standard, and the comparison continues with respect to smaller standards individually in sequence until a standard smaller than the analog signal at that instant is found. At the time of the next succeeding comparison, the value of that smaller reference standard is subtracted from the analog signal. The resulting difference signal is now compared with succeedingly smaller reference standards and new differences formed whenever a reference standard is found smaller than the signal difference with which it had been compared. This process is continued until the selected reference standards, when added, are equal to a value which differs from the instantaneous analog input by less than the smallest reference standard. The number of reference standards used is determined by the resolution required, the system noise level, and the inherent limitations of the conversion equipment.

Illustrative examples of this type of a converter are easily shown. If a pure binary code is desired, the reference values are weighted "0.5000," "0.2500," "0.1250," etc., when the chosen full scale is normalized to unity. If, for example, the analog signal during the conversion time interval has a constant amplitude of 0.5001, and the converter accuracy and sensitivity is approximately one part in ten thousand (0.0001), upon comparison with the first reference standard of "0.5000," an accurate comparison shows that the standard is of a smaller magnitude than the signal; therefore, this standard will be retained and a digital symbol for "1" registered by the converter for this digit. The "0.5000" standard is now subtracted from the analog signal, and the resulting difference signal of 0.0001 used in the next comparison step. Upon comparison with the "0.2500" standard, it will be found that the standard is larger, so that the difference signal remains unaltered for the succeeding comparison and the converter records a symbol "0" for this digit. The next standard "0.1250" is similarly rejected. Succeeding comparisons all result in rejection of their reference standards until the fourteenth and last comparison, whose reference is "0.00006," somewhat less than 0.0001. The converter holds the results of the conversion in a code which represents the retained reference standards by using such a device as a series of binary "flip-flops" or relays which can be "read," for the above conversion, as "10000000000001" (which may be reconstituted as desired to be $$1\times 0.5000 \text{ plus } 1\times 0.00006=0.5001$$

within one part in ten thousand, the instantaneous analog signal magnitude).

Another convenient and commonly used number system is that termed "binary-coded-decimal." In this system the chosen full scale range is described by decimal digits, each decimal digit being individually coded in four or more binary digits. Such a system is often used because of its ready conversion to the familiar decimal system. One binary-coded-decimal system in common use is the "8–4–2–1" code which assigns the same weights to each of the bits as in ordinary binary notation. An encoder adapted to convert two decimal-digit numbers to binary requires eight reference values in two decades, four of the reference standards corresponding to the ten's decimal digit and the remaining four reference standards corresponding to the unit's decimal digit. An illustrative example utilizing again the instantaneous analog signal magnitude "0.5001" would involve a comparison series starting with the reference standard "0.8000" and continuing with the values "0.4000," "0.2000," "0.1000," "0.0800," etc., if the precision of the instrument is again chosen as one part in ten thousand. It is readily seen that the chosen analog signal is less than "0.8000," but larger than "0.4000." After discarding the "0.8000" reference standard and retaining the "0.4000" reference standard, the resulting difference is smaller than the "0.2000" but larger than the "0.1000" standard, resulting in a binary decimal code of "0101" for the first decimal digit. A continuation of this process results in a binary-coded-decimal code of "0000" for the second and third decimal digits, and "0001" for the last decimal digit. By processes analogous to the preceding pure binary code case, the instantaneous analog signal magnitude can be reconstituted as $$1\times 0.4000 \text{ plus } 1\times 0.1000 \text{ plus } 1\times 0.0001=0.5001$$

again to the precision of one part in ten thousand.

A primary disadvantage of encoders known in the prior art which utilize the digit-at-a-time technique is that the accuracy and resolution of each and every comparison step must equal or surpass that of the final step. Thus, in the illustrative example above for the pure binary system, the instantaneous analog signal is "read" as larger than the 0.5000 reference standards. Equivalently, it may be said that the signal is initially classified in a class having a lower bound of 0.5000. This bound must be known to the same accuracy as desired for the ultimate comparison step because succeeding comparisons do not extend the class below 0.5000. Similarly, in the binary-coded-decimal example, after four classifications have been made and the maximum bound of 0.6000 and the minimum bound of 0.5000 are selected, these classifications are irrevocable, and will require the same accuracy as for the final classification if all possible analog signals are to be accurately encoded.

The severe problems associated with this limitation of prior art converters may be shown by example. Taking first the pure binary encoder, assume that although the analog signal at the time of the final comparison will have the value of 0.5001, its value at the first comparison step might easily be less than 0.5000 due to system transients, equipment errors, or fluctuations in the signal. Accurate comparison at the first step, resulting in rejection of the 0.5000 value, will now incorrectly limit the possible encoded values at the final step to 0.4999. Such devices are prone to similar and even larger errors whenever the difference signal is close to the reference standard with which it is being compared. Such devices are therefore seriously limited in speed and accuracy by this erroneous classification process.

Prior art binary-coded-decimal, or "BCD" devices are similarly susceptible to erroneous classification. In the fore-going example a standard BCD machine would be extremely susceptible to error at the time of the fourth or "0.1000" comparison, and system disturbances and fluctuations might readily result in the irrevocable rejection of this standard, with the result that the correct magnitude of 0.5001 would again be erroneously encoded as 0.4999. Other examples which illustrate this detrimental sensitivity to error are readily demonstrable.

Because the accuracy requirement for each step of prior art converters has been maximally severe, these devices have been forced to operate at speeds slow enough to permit the transients introduced by the converter itself to settle down to noise level prior to the establishment of each class. These transients are particularly severe in the first few comparison steps since these involve switching of the largest reference standards. The high accuracy requirement for these large standards conflicts with high switching speeds. The comparator, which is normally an amplifier, can never respond immediately to step voltage changes on its input and will require long settling times to dissipate the effects of large input signals before it is capable of correct comparison of small signals in succeeding comparisons. For example, even if the input signal of "0.5001" in the preceding example were present at the fourth comparison step of the illustrated BCD converter, the third comparison step of "0.2000" would have presented the comparator with an error signal of 0.2000–0.1001 or 0.0999, and this relatively large signal could easily have disturbed the comparator so that it would be incapable of responding correctly at the fourth step to the small 0.0001 difference when even modest encoding speeds are attempted.

Slower encoding speeds to permit thorough settling of such transients not only lower the information-handling speed, but further increase the possibility and magnitude of errors when encoding a signal which is changing. This is a primary limitation, since all signals of value fluctuate, there is no information in an absolutely stationary signal since its value is already known. Since the signal may cross classification boundaries during encoding, conventional systems have often found it necessary to "freeze" the analog signal at a given time by some type of analog "holding" or "memory" technique. Such techniques, however, are sources of errors in themselves and result in frequency limitations on the signal, accuracy degradation, and additional hardware complexity and cost.

Accordingly, it is a principal object of my invention to provide an analog-to-digital converter which can commence digitizing prior to complete settling of the analog signal fed into the converter.

A further object of my invention is to provide an analog-to-digital converter in which the resolution of the initial digitizing steps may be much less accurate than that of the final digitizing step.

It is another object of my invention to provide an analog-to-digital converter in which it is possible to make decisions in the early steps at a rate which does not allow for transient settling of the signal to within the required final accuracy.

It is still another object of my invention to provide an analog-to-digital converter which enables corrections to be made in the latter stages of the weighted decision sequence to correct errors made in earlier decisions.

A further object of my invention is to provide an analog-to-digital converter which may accurately accept analog signals that appear initially either higher or lower in magnitude than their value at the end of the comparison cycle.

Other and further objects, features and advantages of the invention will become apparent as the description proceeds.

Briefly, my invention provides correct encoding at high speeds for fluctuating signals in the presence of system transients by utilizing an increased classification span of succeeding steps beyond that of prior art encoders so that allowance may be made for signal and system uncertainties in preceding comparisons. The number of comparison steps utilized and the degree of uncertainty tolerance incorporated for each comparison step in my invention is adjusted to maximize information handling capacity as restricted by the signal characteristics, comparator characteristics, decoding ease and system cost.

A more thorough understanding of my invention may be obtained by a study of the following detailed description taken in connection with the accompanying drawings in which:

FIG. 1*a* is a graph useful in explaining the operation of prior art analog-to-digital converters to afford a better understanding of my invention;

FIG. 1*b* is a graph illustrating the operation of my invention;

Figure 5A:
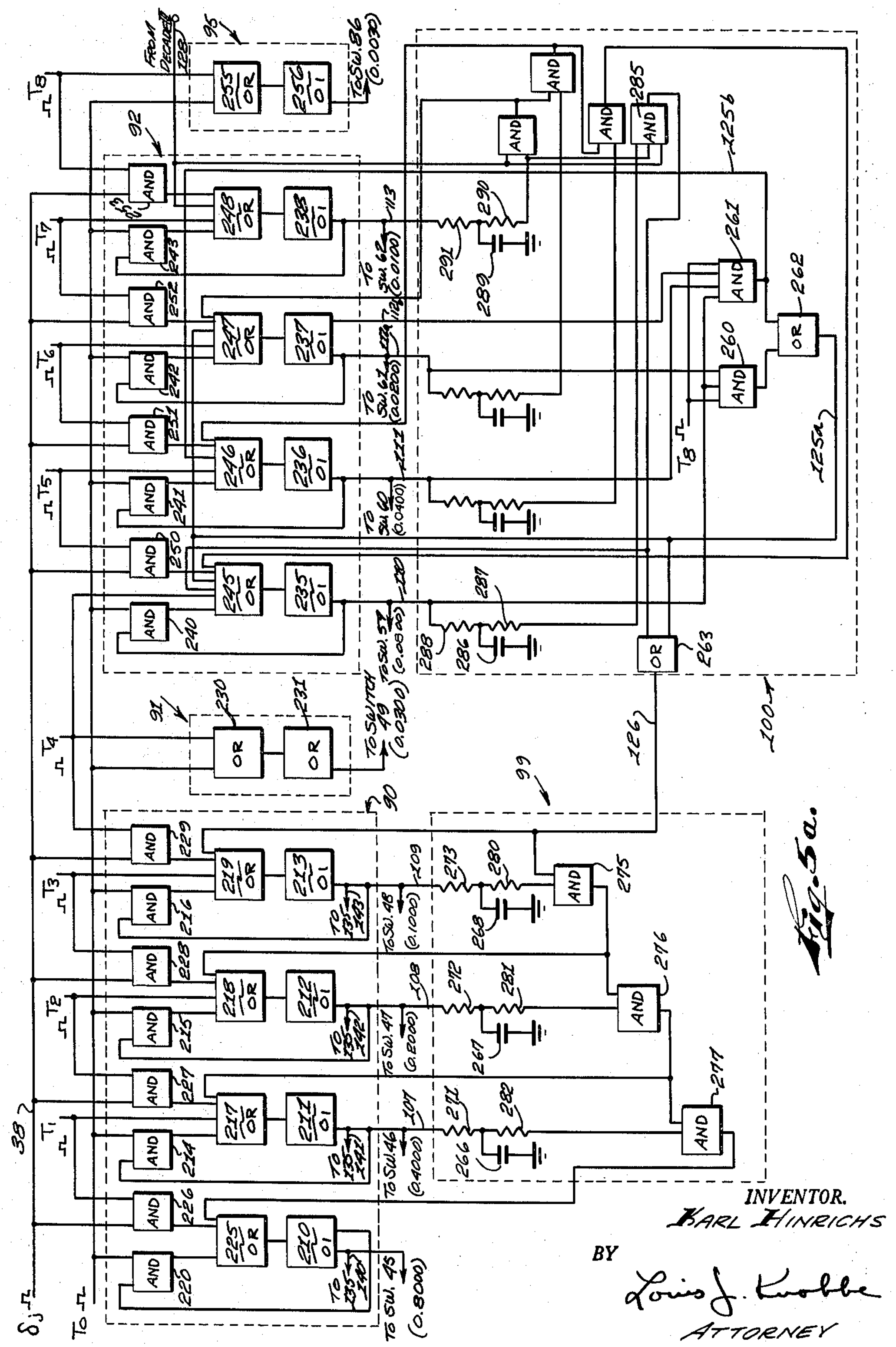
Figure 5B:
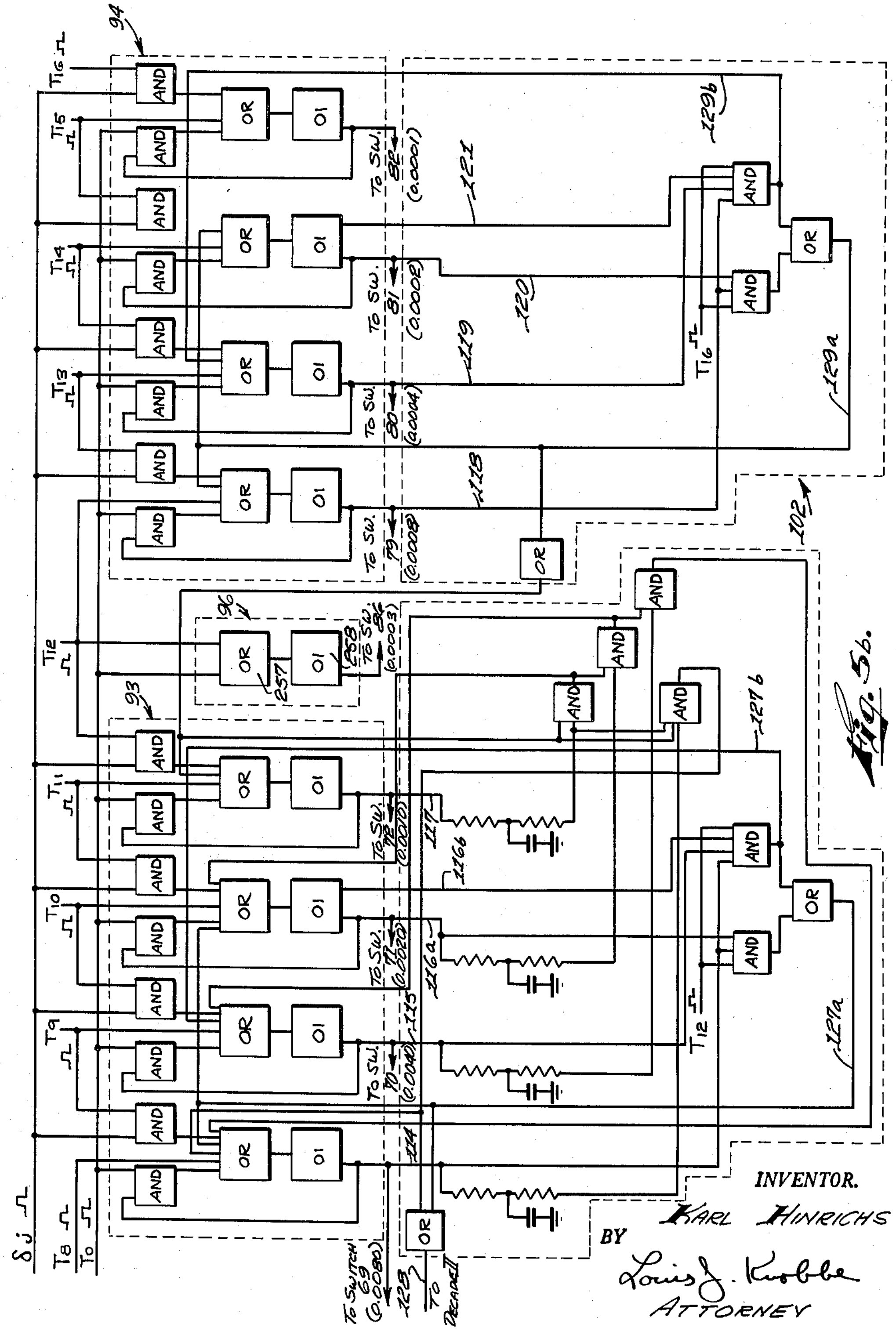
Figure 6:
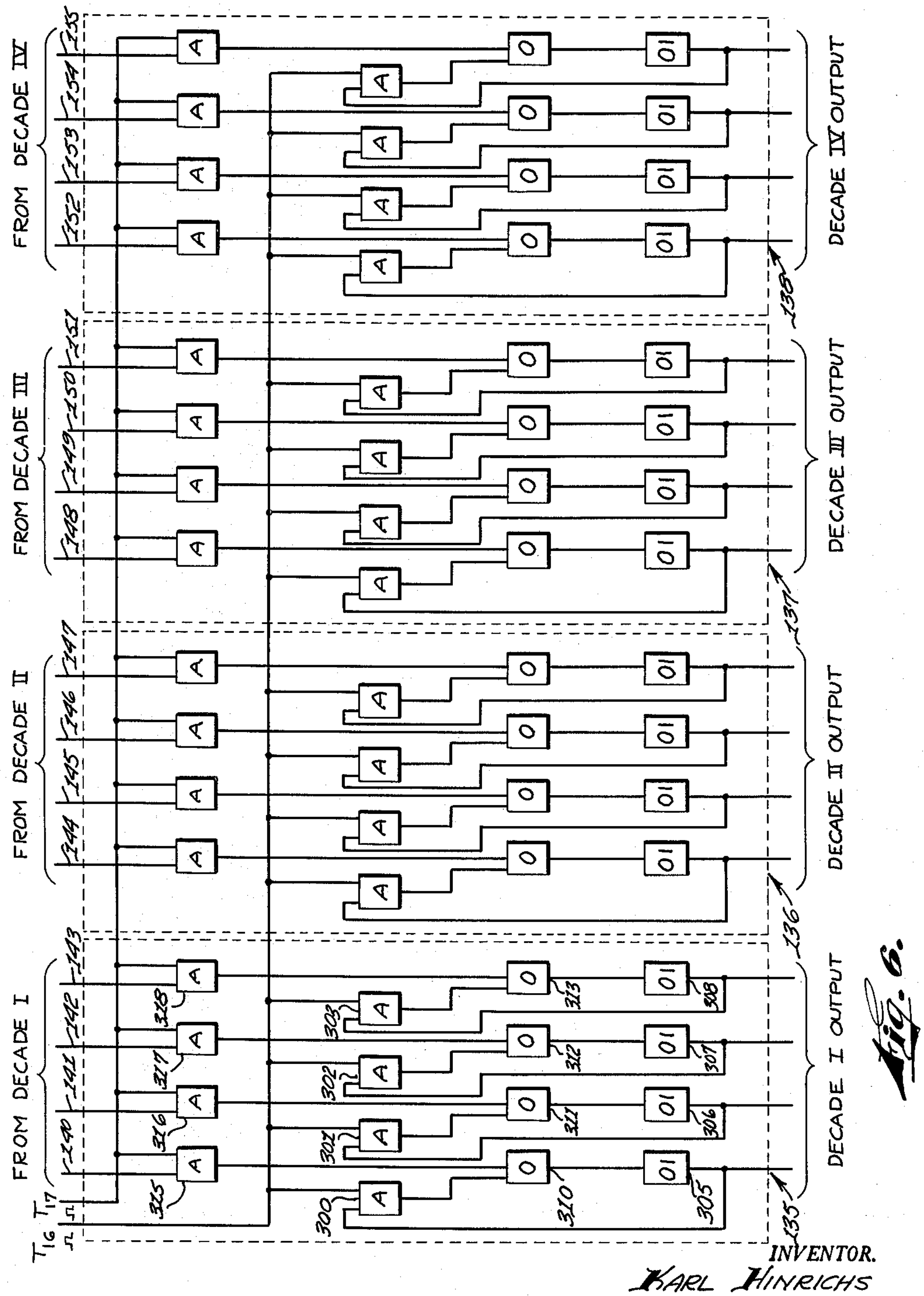

FIGS. 5*a* and 5*b* are schematic illustrations of the control portion of the sequencer and control and the circuitry of the digital code converter of my invention; and FIG. 6 is a schematic illustration of the output register of my invention.

RELATIONSHIP BETWEEN PRIOR ART CONVERTERS AND THE PRESENT CONVERTER

Figures 1A, 1B, 2:
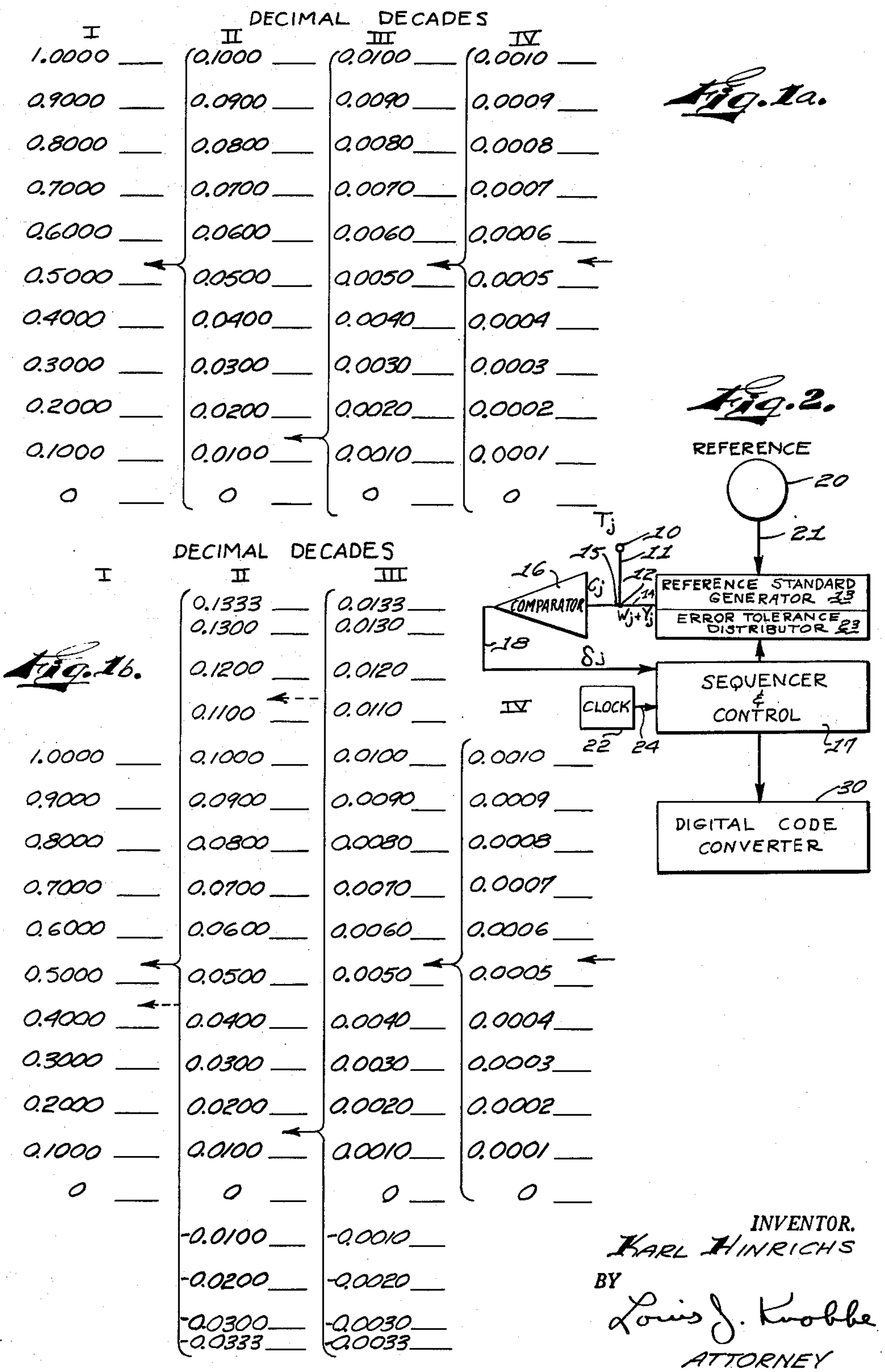
FIG. 2 is a block diagram of a preferred embodiment of my invention.

A graphic illustration of a specific embodiment of my invention and its prior art counterpart are illustrated in FIGS. 1*b* and 1*a*, respectively. Referring now to FIG. 1*a*, the reference standards for a prior art four decade, BCD encoder are illustrated. For the most significant decimal digit, the first decade includes a series of ten reference values extending from 0 to 1.0000, each value being separated by 0.1000 and the chosen full scale being normalized to unity. These reference values may be considered as constituting the boundaries between primary order classes which divide into ten classes the range in which the analog signal can occur. The second decimal decade comprises a secondary class which subdivides the selected primary class into ten subclasses separated by 0.0100; this decade determines the next most significant decimal digit. The third decade comprises ten subclasses each separated by 0.0010 and the fourth decade comprises ten subclasses each separated by 0.0001. Any decimal number lying within the chosen full scale of unity may be encoded by selecting an appropriate class in each of the decades. For example, the encoding of the number 0.5155 is illustrated in FIG. 1*a*. Thus, the fifth class in the first decade; the first class in the second decade and the fifth class in the third and fourth decades are selected (i.e., 0.5000+0.0100+0.0050+0.0005).

The disadvantage of prior art converters as exemplified by the illustration of FIG 1*a* is that the accuracy and resolution of each and every comparison step must equal or surpass that of the final comparison step. Thus, in the foregoing example, the analog input signal was "read" as 0.5155, its true instantaneous value. Assume however, that the signal, due to signal fluctuation or transients within the system, was initially incorrectly "read" as less than 0.5000 but greater than 0.4000. Then, in the first decade classification which digitizes the most significant decimal digit, the 0.4000 primary class would have been selected rather than the correct 0.5000 primary class. The fact that the correct signal reading was made later in the classification would not serve to completely correct the error since the maximum classes in the second, third and fourth decades are 0.0900, 0.0090 and 0.0009. The digitized output would be, therefore, 0.4999 instead of the true value of 0.5155. As heretofore noted, such errors in reading the true analog value require a longer encoding time since the most significant decimal digit must be read to the same accuracy as the least significant decimal digit. Such extended conversion times place increased limits on the frequency and amplitude of the converter, lowering its value and accuracy in contemporary high speed data handling systems.

My invention provides a converter of improved accuracy and increased operating speed by utilizing an increased classification span in succeeding comparison steps. In a specific embodiment operating as illustrated in FIG. 1*b*, the increased classification span is provided in the second and third decades, each of which includes additional secondary classes equally distributed positively and negatively. Thus, the second decade extends from −0.0333 to 0.1333, as contrasted to the prior art conversion span of 0.0100 to 0.1000. In like manner, the third decade of the embodiment of my invention shown in FIG. 1*b* extends from −0.0033 to 0.0133, whereas the prior art conversion span is 0.0010 to 0.0100.

This error tolerance afforded by my converter may be illustrated by encoding an analog signal having an instantaneous true value of 0.5155. If no errors occur in reading the analog signal in any of the comparison steps, each of the classifications will be made as shown by the solid arrows of FIG. 1*b*. However, if for example, an error is made in the initial decimal decade and the signal is read as less than 0.5000, the 0.4000 primary class will be selected instead of the correct 0.5000 primary class. This error may be compressed for by the error tolerance provided by the succeeding decades, since the 0.1100 subclass may be selected instead of the 0.0100 subclass had the initial reading been correct. Classification in the third and fourth decades would then be made as before with a resultant encoding of 0.4000+0.1100+0.0050+0.0005 or a correct total of 0.5155.

The additional subclasses illustrated in FIG. 1*b* may be derived from utilizing a code in which certain digit combinations fall outside the selected code, i.e., a number system having the characteristic that certain combinations of quantities exceed a selected total number greater than any individual number in said system; by the addition of certain error tolerance distributing weights which are added during the comparison sequence; or a combination of these two. An illustration of a number system having certain combinations falling outside the code is the 8–4–2–1 BCD system in which all digital combinations greater than nine are outside the system. Other BCD codes and an adaptation of the standard binary system which may be employed in my invention are described hereinafter.

As shown in FIG. 1*b*, the additional secondary classes are normally equally distributed between positive and negative values of error tolerance. The negative error tolerances provided in the second and third decades permit a number to be read initially higher than its actual value. Thus, if a number having a true instantaneous value of 0.4500 was erroneously read as being greater than 0.5000, a negative error tolerance may be selected in the second and third decades so as to obtain corect encoding. In certain applications, however, it may be desirable to distribute unevenly the error tolerance and in some instances have the entire error tolerance as either a positive or negative value. An important example of this principle is found in systems wherein the converter is used to synchronize encoding with commutation of analog signals. If the sampling is such as to provide a true zero converter input between channels, and the system is adequately damped, probable error is always negative. A considerable increase in system accuracy and/or speed can now be obtained if all of the built-in error tolerance of my invention is applied in one direction. The desiderata involved in selection of appropriate error tolerance distribution for specific applications in accordance with my invention will become more apparent as the description proceeds.

MATHEMATICAL DESCRIPTION OF THE PRESENT CONVERTER

A few mathematical definitions and relations help to clarify the fundamental features of my invention. The following Table I lists some of these useful concepts.

*Table I*

(a) $N$=number of comparison steps.

(b) $j$=designator for a typical comparison step between 1 and N.

(c) $T_j$=value of the incoming signal at step $j$. $T_N$ is the true value of the signal at the last comparison step.

(d) $W_j$=reference standard added at step $j$ and subsequently retained or rejected.

(e) $X_j$=total error between apparent signal at step $j$ and its final value $T_N$.

(f) $K_j$=built-in tolerance for error at step $j$.

(g) $Y_j$=added tolerance-distributing weight at step $j$, not subsequently retained.

(h) $C_j$=comparator input at step $j$.

(i) $\delta_j$=comparator output at step $j$ equals "1" for retained standard, equals "0" for rejected standard.

(j) $F$=fineness or resolution of the comparison process.

The basic operation of the converter of my invention is readily established by noting that the converter output (the sum of all retained reference standards) should equal the true signal input at the last step within the required fineness. Mathematically, $$\sum_{j=1}^{N} W_j\delta_j = T_N \pm F \qquad (1)$$

where the "retained or rejected" signal $$\delta_j = \begin{cases} 1 \text{ if } C_j > 0 \\ 0 \text{ if } C_j \leq 0 \end{cases} \qquad (2)$$

and the comparator input of my invention is $$C_j = T_N + X_j - \sum_{X=1}^{j=1} W_x\delta_x - W_j - Y_j \qquad (3)$$

the difference between (a) the instantaneous signal-plus-error at step $j$ minus the sum of all previously retained reference standards, and (b) the reference standard and error distributing weights for this step.

My invention provides excess counting ability in succeeding steps, i.e., on one or more of the $j$ comparison steps the sum of the succeeding reference standards is greater than the true value of the signal minus the retained reference standards up to but not including step $j$. Expressed mathematically as an inequality:

$$\sum_{x=j}^{N} W_x > T_N - \sum_{x=1}^{j-1} W_x \delta_x \qquad (4)$$

so that any given comparison except possibly the last or last few may have its accuracy requirement reduced by an error tolerance, $$K_j = \sum_{x=j+1}^{N} W_x - W_j \qquad (5)$$

My invention also provides that this error tolerance may be distributed in a manner to suit the circuitry and signal nature by adjusting the error distributing weight for each step as follows:

$$Y_j = mK_j \qquad (6)$$

where $m$ is the chosen proportion. As noted above, normally equal tolerance to plus or minus values of $X_j$ will be desired and $m$ will be ½.

The comparison process in my invention, denoted by Equation 3 above, permits large values of error $X_j$ to exist at early steps without the subsequent irrevocable errors of prior art converters. An example readily illustrates the process. If a coding system is chosen which has a first comparison with a reference standard of ½ full scale, or 0.5000 on a normalized-full-scale basis, but the sum of the succeeding smaller comparison steps is made equal to 0.6000, $$W_1 = 0.5000; \sum_{x=2}^{N} W_x = 0.6000 \qquad (7)$$

then from Equation 5

$$\sum_{x=2}^{N} W_x - W_1 = K_1 = 0.1000 \qquad (8)$$

The total error between the apparent input signal at step 1 and its final value ($X_1$) may then be as much as plus or minus 0.0500 without endangering the comparison accuracy.

From Equation 6 ($m = ½$)

$$Y_1 = ½(0.1000) = 0.0500 \qquad (9)$$

This is readily apparent by considering the two extremes.

(a) Noise at a positive maximum; $W_1$ accepted, i.e., $$C_1 = T_N + X_1 - W_1 - Y_1 > 0 \qquad (10)$$

or $$T_N + 0.0500 - 0.5000 - 0.0500 > 0 \qquad (11)$$

or $$T_N > 0.5000 \qquad (12)$$

which is just the value of the retained reference standard, so that the remaining weights are all rejected, and (b) Noise at a negative maximum; $W_1$ rejected, i.e., $$C_1 = T_N + X_1 - W_1 - Y_1 \leqslant 0 \qquad (13)$$

or $$T_N - 0.0500 - 0.5000 - 0.0500 \leqslant 0 \qquad (14)$$

or $$T_N \leqslant 0.6000 \qquad (15)$$

which is just the stated ability of the remaining steps to count to within the required fineness F.

The proof of adequacy of the conversion process illustrated above may be similarly demonstrated for the general case at any step $j$, with any required error tolerance $K_j$, for any convenient coding array $W_j$, to any required resolution F. The number of steps required can then be obtained, or the relations inverted to obtain F, $K_j$, or the necessary counting ability $$\sum_{x=j+1}^{N} W_x$$

at any step, by use of Relations 1 through 6 above.

One preferred form of my invention applies the process to the standard binary system. If the system and signal errors likely at any step are considered proportional to the reference standard value of that step, $$K_j = pW_j \qquad (16)$$

where $p$ is a chosen per-unit value.

If equal tolerance to plus and minus errors is desired, $$Y_j = ½K_j = ½pW_j \qquad (17)$$

Substituting Equation 16 into Equation 5 gives $$pW_j = \sum_{x=j+1}^{N} W_x - W_j \qquad (18)$$

or $$W_j(1+p) = \sum_{x=j+1}^{N} W_x \qquad (19)$$

In a standard binary system with full scale normalized to unity, $$\sum_{x=1}^{j-1} W_x - W_j + \sum_{x=j+1}^{N} W_x = 1 \qquad (20)$$

or $$1 - \sum_{x=1}^{j-1} W_x - W_j = \sum_{x=j+1}^{N} W_x \qquad (21)$$

Combining Equations 19 and 21 provides:

$$W_j(1+p) = 1 - \sum_{x=1}^{j-1} W_x - W_j \qquad (22)$$

or $$W_j = \frac{1}{2+p}\left[1 - \sum_{x=1}^{J-1} W_x\right] \qquad (23)$$

In a normal binary system $$\sum_{x=1}^{J-1} W_x = W_{j-1} + \sum_{x=1}^{J-2} W_x \qquad (24)$$

From Equation 24, $W_{j-1}$ may be calculated as $$W_{j-1} = \frac{1}{2+p}\left[1 - \sum_{x=1}^{j-2} W_x\right] \qquad (25)$$

Combining Equations 22, 23 and 24

$$W_j = \frac{1}{2+p}\left\{1 - \frac{1}{2+p}\left[1 - \sum_{x=1}^{j-2} W_x\right] - \sum_{x=1}^{j-2} W_x\right\} \qquad (26)$$

$$= \frac{1}{2+p}\left[1 - \frac{1}{2+p}\right]\left[1 - \sum_{x=1}^{j-2} W_x\right] \qquad (27)$$

Repeating the above steps and successively calculating for $j-1$ from $j$ gives the equation $$W_j = \frac{1}{2+p}\left[1 - \frac{2}{2+p}\right]^{j-1}\left[1 - \sum_{x=1}^{1} W_x\right] \qquad (28)$$

Since $$\sum_{x=1}^{1} W_x = 0 \qquad (29)$$

the optimum reference standard of my invention used at any given step in a regular binary system is $$W_j = \frac{\left(1 - \frac{1}{2+p}\right)^{j-1}}{2+p} \qquad (30)$$

Since the resolution of a regular binary system is equal to the reference standard at the final or Nth step, the resolution may be derived from Equation 30 as $$F = \frac{(1+p)^{N-1}}{(2+p)^N} \qquad (31)$$

Utilizing Equations 17, 30, and 31, a detailed example of the reference standards error-distributing weights and permissible error may be derived as tabulated in Table II, below, for a twenty-one-step standard binary converter with fineness of 0.01% and an error tolerance of 100% (plus or minus 50% distribution of this tolerance is chosen for the example). For convenience, rounding off is made within the fineness tolerance. Note that the weights do not have the same ratios as in the classical "pure binary" distribution, since they are derived in accordance with my invention. This distribution shares with "pure binary," however, stepwise uniformity in contrast to the "bunching" or "grouping" distribution of the BCD systems hereinafter described.

*Table II*

| Step No. | Reference Standard | Error Distributing Weight | Permitted Error |
|---|---|---|---|
| 1 | 0.3333 | 0.1667 | ±0.1667 |
| 2 | 0.2222 | 0.1111 | ±0.1111 |
| 3 | 0.1481 | 0.0741 | ±0.0741 |
| 4 | 0.0988 | 0.0494 | ±0.0494 |
| 5 | 0.0659 | 0.0329 | ±0.0329 |
| 6 | 0.0439 | 0.0219 | ±0.0219 |
| 7 | 0.0292 | 0.0146 | ±0.0146 |
| 8 | 0.0195 | 0.0098 | ±0.0098 |
| 9 | 0.0130 | 0.0065 | ±0.0065 |
| 10 | 0.0087 | 0.0044 | ±0.0044 |
| 11 | 0.0058 | 0.0029 | ±0.0029 |
| 12 | 0.0039 | 0.0019 | ±0.0019 |
| 13 | 0.0026 | 0.0013 | ±0.0013 |
| 14 | 0.0017 | 0.0009 | ±0.0009 |
| 15 | 0.0011 | 0.0006 | ±0.0006 |
| 16 | 0.0008 | 0.0004 | ±0.0004 |
| 17 | 0.0005 | 0.0003 | ±0.0003 |
| 18 | 0.0004 | 0.00015 | ±0.00015 |
| 19 | 0.0003 | 0.0001 | ±0.0001 |
| 20 | 0.0002 | 0.00005 | ±0.00005 |
| 21 | 0.0001 | None | None |

Extension of this invention to include systems arranged for an optimum error tolerance distribution derived from multiple time-constant systems or those with predictable systematic disturbances is readily apparent.

Table III illustrates the different error tolerances, number of steps, and degree of resolution obtainable with stepwise-uniform coding, as derived from Equations 16, 30 and 31.

*Table III*

| F<br>Resolution in Percent of Full Scale | $K_j$<br>Total Plus and Minus Error Allowed, in Percent of Step Standard | $W_1$<br>First Reference Standard, Percent of Full Scale | N<br>Number of Steps |
|---|---|---|---|
| 0.1% | 1% | 49.8% | 10 |
| 0.1% | 18% | 45.9% | 11 |
| 0.1% | 36% | 42.4% | 12 |
| 0.01% | 9% | 47.9% | 14 |
| 0.01% | 21% | 45.2% | 15 |
| 0.01% | 100% | 33.33% | 21 |
| 0.01% | 195% | 25.3% | 28 |

It can be seen from the above table that an enormous return in tolerance to errors (signal fluctuations, amplifier settling, switch transients, etc.) is obtained for the use of only a few steps beyond the minimum required ("pure binary"). It is also obvious that the return for a greatly increased number of steps, although large, probably does not justify the length and complexity of this more elaborate process. The limiting case is readily seen to be that where all reference standards have the same size and the number of steps taken is equal to the reciprocal of the fineness necessary.

Although the foregoing mathematical analysis is based upon the normal binary code, it will be apparent as the description proceeds that my invention is equally applicable for analog-to-digital converters operating with other electronic computer codes. Thus, any of the many codes in which each of a series of decimal digits is represented by a group of two-state weights may be used as the background weighting distribution for my invention. Useful examples of such codes are the "8–4–2–1," "5–3–2–1," and the "9–5–3–2–1" binary coded decimal systems (hereinafter referred to as "BCD" systems). The "bunched" or "grouped" forms of my invention do not permit free choice or smooth distribution of error tolerance at each step, but have practical advantage in the simplicity of conversion of the retained reference standards to the conventional and convenient decimal readout. Reference standard simplicity and switch simplifications often result when certain simplified choices of error-distributing weights are used, for example, a single error-distributing weight for each decade of a BCD code such as "8–4–2–1."

Table IV below illustrates some of the BCD forms of my invention.

*Table IV*

| Step No. | "8-4-2-1" 0.01% | | "5-3-2-1" 0.01% | | "9-5-3-2-1" 0.01% | | "6-3-2-1" 0.01% | |
|---|---|---|---|---|---|---|---|---|
| | Reference Standard $W_j$ | Total and Error Tolerance $K_j$ | Reference Standard $W_j$ | Total and Error Tolerance $K_j$ | Reference Standard $W_j$ | Total and Error Tolerance $K_j$ | Reference Standard $W_j$ | Total and Error Tolerance $K_j$ |
| 1 | .8000 | .0666 | .5000 | .2222 | .9000 | .4221 | .6000 | .1333 |
| 2 | .4000 | .0666 | .3000 | .1222 | .5000 | .3221 | .3000 | .1333 |
| 3 | .2000 | .0666 | .2000 | .0222 | .3000 | .2221 | .2000 | .0333 |
| 4 | .1000 | .0666 | .1000 | .0222 | .2000 | .1221 | .1000 | .0333 |
| 5 | .0800 | .0066 | .0500 | .0222 | .1000 | .1221 | .0600 | .0133 |
| 6 | .0400 | .0066 | .0300 | .0122 | .0900 | .0421 | .0300 | .0133 |
| 7 | .0200 | .0066 | .0200 | .0022 | .0500 | .0321 | .0200 | .0033 |
| 8 | .0100 | .0066 | .0100 | .0022 | .0300 | .0221 | .0100 | .0033 |
| 9 | .0080 | .0006 | .0050 | .0022 | .0200 | .0121 | .0060 | .0013 |
| 10 | .0040 | .0006 | .0030 | .0012 | .0100 | .0121 | .0030 | .0013 |
| 11 | .0020 | .0006 | .0020 | .0002 | .0090 | .0041 | .0020 | .0003 |
| 12 | .0010 | .0006 | .0010 | .0002 | .0050 | .0031 | .0010 | .0003 |
| 13 | .0008 | None | .0005 | .0002 | .0030 | .0021 | .0006 | .0001 |
| 14 | .0004 | None | .0003 | .0001 | .0020 | .0011 | .0003 | .0001 |
| 15 | .0002 | None | .0002 | None | .0010 | .0011 | .0002 | None |
| 16 | .0001 | None | .0001 | None | .0009 | .0003 | .0001 | None |
| 17 | ------ | ------ | ------ | ------ | .0005 | .0002 | | |
| 18 | ------ | ------ | ------ | ------ | .0003 | .0001 | ------ | ------ |
| 19 | ------ | ------ | ------ | ------ | .0002 | None | ------ | ------ |
| 20 | ------ | ------ | ------ | ------ | .0001 | None | ------ | ------ |

It is readily apparent that the above BCD classifications of my invention may be extended to a wide variety of other "grouped" codes with a base of 10 or some other convenient number. The code chosen, it is shown, depends strongly on the error-tolerance distribution appropriate to the application.

By a slight increase in nonuniformity and complexity an improved error tolerance for BCD or "grouped" codes may be obtained by altering the coding of the most significant decimal decade only, from that shown in Table IV. It is noted for all of the codes shown in Table IV that the counting capability of the accumulated weights of each series exceeds the normalized full scale of 1.0000. Altering the first decade reference standards so that overcounting is not possible permits increased error tolerances in the important first few comparison steps. Table V, below, demonstrates the modified BCD systems of Table IV if their most significant decades are altered to take full advantage of their counting ability. If this process, at some cost in logic and equipment complexity, is carried further to fractional weights in the first decade, an even smoother gradation of error tolerances is possible. The limiting case when fractional weights are admitted is found to be the stepwise uniform embodiment typified by Tables II and III.

These modified codes of the reference standards in the most significant decade, if only whole multiples of 0.1 are admitted, may be superimposed on any chosen "grouped" code provided the final sum of the reference standards equals or exceeds 1.0000. Such mixed codes can be designated by the symbols shown in Table V, such as "4221/6321." This signifies that the first decade is coded .4000, .2000, .2000, .1000, and that the remainder of the reference standards are coded in the ratio 6 to 3 to 2 to 1, as detailed in Table IV.

In operation, a reference voltage or current source 20 supplies a reference voltage or current to the reference standard generator 13 through a connecting line 21. The reference standard generator 13 proceeds to provide electrical increments or quantities of stepped magnitude which are the analog equivalents of the reference standards $W_j$. A portion of the reference standard generator denoted as an error-tolerance distributor 23 provides stepped increments which are the analog equivalents to the tolerance-distributing weights $Y_j$. The reference standard $W_j$ and tolerance-distributing weight $Y_j$ are subtracted from the analog signal $T_j$ in accordance with Equation 3 above, and an output signal $\delta_j$ is generated by comparator 16 to indicate whether or not the reference standard $W_j$ should be retained or rejected. The difference (provided at the error junction 12 and applied to the input of the comparator 16) between the analog input ($T_j$) and a reference signal ($W_j+Y_j$) is compared to ground by the comparator 16 to determine if the difference (between the analog input and the reference) is less than or greater than ground. The comparator 16 provides one output when the reference is larger than the analog input, and another output when the analog input is larger than the reference. The output of the comparator 16 is supplied to an input of the sequencer and control device 17. Signals are generated by the sequencer and control device 17 and supplied to the reference standard generator 13 to sequentially select each increment step.

A clock pulse generator 22 connected to the sequencer and control device 17 by connecting line 24 generates periodic spaced pulses for controlling the system operation. The output sequencing pulses of the sequencer and

*Table V*

EXAMPLES OF NONUNIFORM BCD ENCODING OF MOST SIGNIFICANT DECADE

| Step No. | "3321/8421" | | "4221/5321" | | "3221/95321" * | | "22211/95321" | |
|---|---|---|---|---|---|---|---|---|
| | $W_j$ | $K_j$ | $W_j$ | $K_j$ | $W_j$ | $K_j$ | $W_j$ | $K_j$ |
| 1 | .3000 | .4666 | .4000 | .2222 | .3000 | .4221 | .2000 | .6221 |
| 2 | .3000 | .1666 | .2000 | .2222 | .2000 | .3221 | .2000 | .4221 |
| 3 | .2000 | .0666 | .2000 | .0222 | .2000 | .1221 | .2000 | .2221 |
| 4 | .1000 | .0666 | .1000 | .0222 | .1000 | .1221 | .1000 | .2221 |
| 5 | ↑ | ↑ | ↑ | ↑ | ↑ | ↑ | .1000 | .1221 |
| 6 | | | | | | | ↑ | ↑ |
| 7 | | | | | | | | |
| 8 | | | | | | | | |
| 9 | "8421" as in | | "5321" as in | | | | | |
| 10 | Table IV | | Table IV | | | | | |
| 11 | | | | | "95321" as in | | | |
| 12 | | | | | Table IV | | | |
| 13 | | | | | | | "95321" as in | |
| 14 | | | | | | | Table IV | |
| 15 | | | | | | | | |
| 16 | ↓ | ↓ | ↓ | ↓ | | | | |
| 17 | | | | | | | | |
| 18 | | | | | | | | |
| 19 | | | | | ↓ | ↓ | | |
| 20 | | | | | | | ↓ | ↓ |

*Note number of steps cut by one.

THE SYSTEM AS A WHOLE

In order to more fully describe my invention, a complete converter is illustrated in block diagram form in FIG. 2. As shown therein, the analog input $T_j$ is connected to terminal 10. Connecting line 11 couples terminal 10 to a summing point 12. A reference standard generator 13 is likewise connected to summing point 12 through connecting line 14. Connecting line 15 couples summing point 12 as the input $C_j$ of a comparator 16. The output $\delta_j$ of comparator 16 is connected to the input of a sequencer and control device 17 by connecting line 18. One output of the sequencer and control device 17 is connected to the reference standard generator 13.

control device are initiated by the clock pulses. After each of the increment steps have been generated and compared with the input signal in the comparator 16, an accumulation of increments will be manifested by the device 17. As heretofore noted, if there has been an error in the initial reading of the analog input, the reference standard generator may generate a suitable signal for compensating for this error, although this signal will not correspond to the selected code. Accordingly, a digital code converter 30 is connected to another output of the sequencer and control device 17 so that the digital information may be read out in the desired code.

COMPARATOR, REFERENCE AND INPUT CIRCUIT OF SEQUENCER AND CONTROL DEVICE

Figure 3:
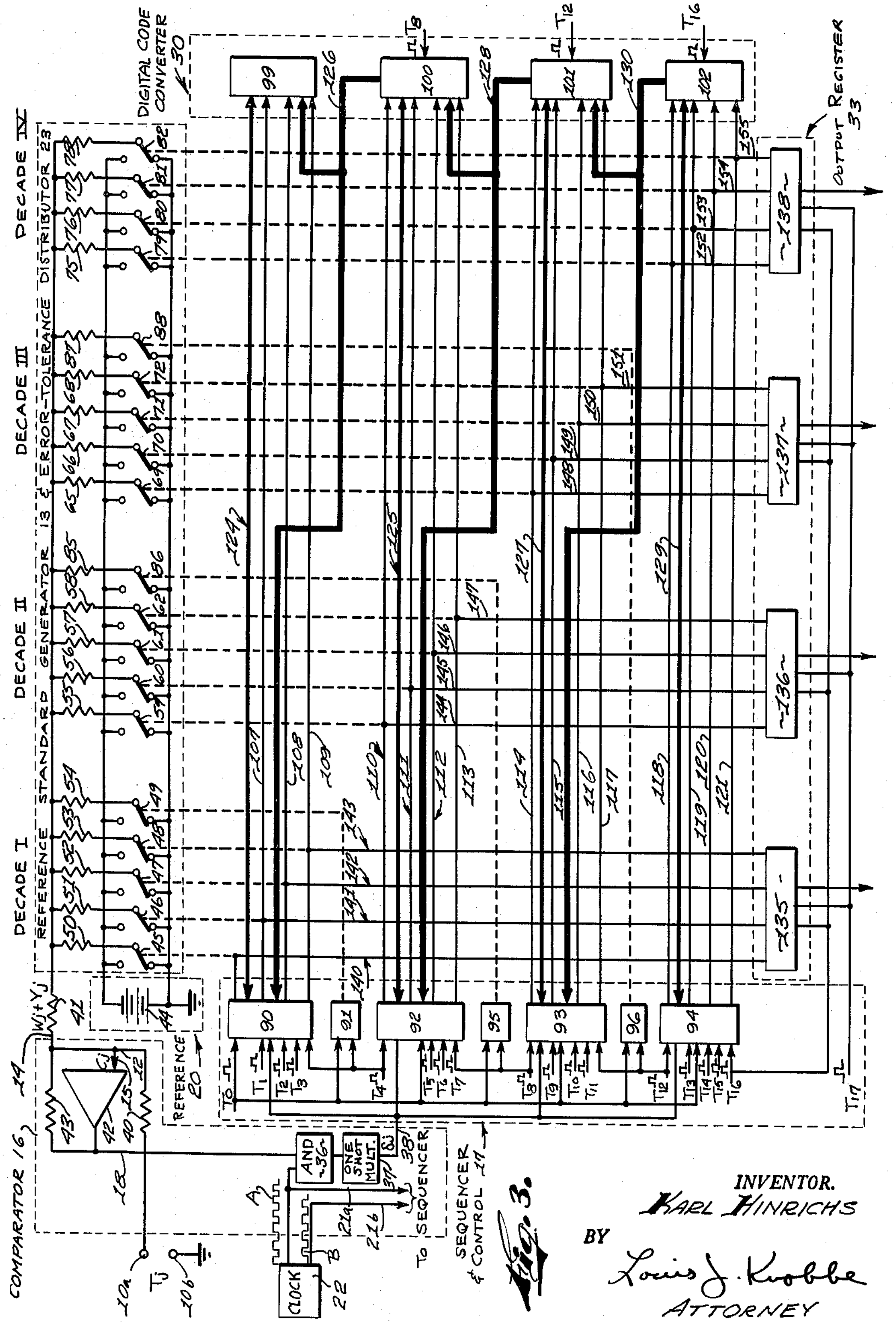
FIG. 3 is a partially schematic, partially block diagram of one embodiment of my invention.

An analog-to-digital converter constructed in accordance with my invention is shown in more detail in FIG. 3 wherein like reference numerals are employed to designate elements referred to previously. The analog input $T_j$ is connected between terminals 10*a* and 10*b*, terminal 10*a* being connected to summing point 12 through a resistor 40 by connecting line 11 and terminal 10*b* being connected to a common terminal which may be at ground potential as illustrated. The output of reference standard generator 13 is carried by connecting line 14 to summing point 12. Connecting line 14 includes series resistor 41.

Comparator 16 comprises a high gain feedback amplifier 42 having a feedback resistor 43 connected between its output and input. As is well known in the art, the output voltage of an operational feedback amplifier such as amplifier 42 is very precisely equal to the sum of the currents at its input or summing point 12 multiplied by the resistance of feedback resistor 43. In most feedback amplifiers, the sign of the output voltage will be opposite that of the input voltage.

Reference source 20 may comprise a direct current source illustrated as a battery 44 having its positive pole connected to the common terminal and its negative pole connected to the input of the reference standard generator 13 by connecting line 21.

The input analog signal is assumed to be positive in the system shown in FIG. 3. If the input analog signals vary in polarity, polarity sensing means (not shown) are well known in the art and may be connected to detect polarity changes. By simply changing the polarity of the reference source 20, a quantity of appropriate polarity will be generated by the reference standard generator 13.

Reference standard generator 13 may conveniently comprise a conductance adder providing at its output either voltage or current increments. For the system shown and described hereinafter, the reference standards $W_j$ and tolerance distributing weights $Y_j$ are current values which are compared with the current magnitude of the input analog signal $T_j$.

For positive analog inputs to the system of FIG. 3, the current increments representing the reference standards $W_j$ must be negative. Thus, the input analog current and conductance adder output current will be subtracted by the amplifier 42. When the output of the amplifier is negative, it means that the analog input has a higher value than the current output from the reference standard generator (remembering that amplifier 42 acts as a phase inverter). The amplifier output is positive when the output of the reference standard generator is larger than the analog input.

As previously noted, a reference standard is to be retained and subtracted from the analog input when the analog input is larger than the reference standard; conversely, a reference standard is to be rejected when the analog input is smaller than the reference standard. For providing this function, the output portion of the comparator 16 includes "and" gate 36 and one-shot multivibrator 37. Specific circuitry for these devices is not shown since the details thereof are well known in the art. The amplifier output and a series of "A" pulses from clock generator 22 are supplied as input signals to the "and" gate. When both are positive, i.e., when the analog input is smaller than the output of the conductance adder, the "and" gate receives a positive signal at both of its inputs and passes a pulse which turns over the one-shot multivibrator. When the amplifier output is negative, i.e., when the analog input is larger than the conductance adder output, the "and" gate 36 does not receive a positive signal at both of its inputs and so will not pass a pulse to the one-shot multivibrator. The multivibrator output, designated by $\delta_j$, is connected to the control elements of the sequencer and control device by connecting line 38 only when the reference standard is too large and must be rejected, i.e., $\delta_j$ is "1" in Equation 1 above when it is present at the output of one-shot multivibrator 37 and "0" in Equation1 when it is not so present.

REFERENCE STANDARD GENERATOR

The reference standard generator 13 is shown to comprise a conductance adder having a plurality of precision resistors and a plurality of switches for connecting the resistors in particular arrangements. Although for purposes of illustration mechanical single-pole double-throw switches are illustrated, it will be understood that preferably high speed electronic switches known to those skilled in the art will be utilized. The 8–4–2–1 BCD system has been selected for implementing the generator in this embodiment, and the conductances are weighted according to the reference standards ($W_j$) and error tolerances ($K_j$) as tabulated above in Table IV.

The first and most significant decimal decade includes single-pole double-throw switches 45, 46, 47 and 48. Each of these switches have two input terminals, one of which is connected to the reference source 20. The output terminal of each of these switches is connected to the respective movable contact; each of these switch output terminals is in turn connected to a respective one of the resistors 50, 51, 52 and 53. These resistors have resistance values which will give the reciprocal conductance values for the desired reference standards, or 0.8000, 0.4000, 0.2000, and 0.1000. As is well known in the art, the actual conductance values may be at any desired level so long as they retain these relationships herein normalized to unity for convenience . It will be understood these these resistors may also be valued to give the reciprocal conductance values for a nonuniform BCD system as tabulated in Table V above. As noted supra, altering the coding of the most significant decimal decade permits increased error tolerances in the first few comparison steps. Depending upon the particular code selected, the digital code converter 30 is suitably constructed to decode the particular nonuniform BCD system selected.

The second, third and fourth decimal decades of the reference standard generator 13 are arranged similarly to the first decade, in each case comprising the first four resistors and associated switches of each decade. Thus, resistors 55, 56, 57 and 58 and associated switches 59, 60, 61 and 62 comprise the second decade; resistors 65, 66, 67 and 68 and associated switches 69, 70, 71 and 72 comprise the third decade; and resistors 75, 76, 77 and 78 and associated switches 79, 80, 81 and 82 comprise the fourth and least significant decimal decade. The resistors 55, 56, 57 and 58 provide conductance values of .0800, .0400, .0200 and .0100; the resistors 65, 66, 67 and 68 provide conductance values of .0080, .0040, .0020 and .0010; and the resistors 75, 76, 77 and 78 provide conductance values of .0008, .0004, .0002, and .0001.

The decimal decades described above function in a manner identical with that of prior art conductance adders in analog-to-digital converts. When none of the switches in the reference standard generator is actuated, each of the resistors is connected by the switches to the common terminal and thus no reference standard current is generated by the generator 13. On actuation of one or more switches, the output current increment of the reference standard generator 13 is equal to the voltage of reference source 20 ($V_{ref}$) multiplied by the sum of the conductances of the resistors that are connected to line 21 which is in turn connected to the negative terminal of voltage source 44. Thus, the current output from the conductance adder is given by the equation:

$$I_{out}=V_{ref}G_1 \qquad (32)$$

where $G_1$ is the total conductance connected to the reference source. According to Equation 32 the output current is proportional to the sum of the conductances connected to conductor 21. Therefore, if the resistors are valued to give the conductances discussed, a series of selectably addible, stepped currents may be obtained for comparison with the analog input.

ERROR-TOLERANCE DISTRIBUTOR CIRCUIT

The error-tolerance distributor circuit 23 comprises resistors 54, 85, 87 and respectively associated switches 49, 86, 88. Resistors 54, 85 and 87 are valued to give respective conductance values of 0.0300, 0.0030 and 0.0003. As with the resistors in the reference standard generator, these values are normalized to unity for convenience. With all conductances in circuit, a total tolerance-distributing conductance of 0.0333 is inserted; with resistors 85 and 87 only in circuit, a total tolerance-distributing conductance of 0.0033 is inserted; and with only resistor 87 in circuit, a total tolerance-distributing conductance of 0.0003 is inserted. In so valuing these resistance values, the "*m*" of Equation 6, supra, has been selected as ½ so that the error tolerance tabulated in Table IV is evenly distributed between positive and negative values. It will be apparent as the description proceeds that "*m*" may be varied simply by changing the values of these resistors; thus, if the particular data handling system in which the analog-to-digital converter of the invention is incorporated encounters only positive errors, the resistors 54, 85 and 87 and associated switches can be deleted, thereby giving a total error tolerance of 0.0666 in the first decimal decade for errors of unidirectional positive polarity. If, on the other hand, the errors are entirely negative, the conductance of resistor 54 may be selected as 0.0600, the conductance of resistor 85 selected as 0.0060, and the conductance of resistor 87 as 0.0006 so as to give a total error tolerance of 0.0666 in the first decimal decade for errors of unidirectional negative polarity.

Referring again to the particular embodiment of my invention illustrated in FIG. 3, a total tolerance-distributing conductance of 0.0333 is added to the reference standards generated during the first decade. Stated in another way, an additional current of 0.0333 magnitude is subtracted from the analog input signal so that the analog signal appears 0.0333 lower in value throughout the comparison of the first decade. The tolerance-distributor circuit in the first decade has the effect of obtaining coded values for a signal which is 0.0333 lower in value than the actual analog input. Thus, if the analog input signal is erroneously read higher than it actually is, the system will be able to compensate for the incorrect reading since it has already subtracted an error tolerance-distributing weight of 0.0333 prior to the first decade comparison.

A major source of erroneous classification lies in the finite response time of the comparator to changes in its input. The largest input changes occur when the most significant digits are switched in the conductance adder. The possibility that the output of the comparator amplifier has not yet reached its final value is especially present under these circumstances. Therefore, the total tolerance-distributing conductance of 0.0333 is inserted during the first decimal decade comparison. During the comparison of the second decimal decade with the analog input, the resistance 54 is disconnected from the reference 20 by deactuating switch 49 thereby leaving a tolerance-distributing conductance of 0.0033 during the second decimal decade comparison. However, the magnitude changes occurring in $C_j$, the comparator during this decade comparison, are considerably lower valued than during the first decade comparison and the maximum error tolerance of ±0.0033 during this second decade comparison substantially improves the accuracy of the converter. In like manner, the maximum allowable error during the comparison of third decimal decade is ±0.0003. Accordingly, switch 86 is deactuated during the third decimal decade comparison and only tolerance-distributor switch 88 remains actuated during this decade comparison. During the fourth or units comparison, the final accuracy of the system is determined and therefore no error-tolerance-distributor values are permitted at this time. However, since this comparison is made at the end of the conversion period, signal fluctuations and system transients will have become substantially zero at this time.

By way of illustration, a numerical example may be given to further illustrate the function of the error-tolerance-distributor circuitry. Assume that the true value of the analog signal at the last comparison step ($T_n$) is 0.4888 but that initially it is erroneously read as greater than 0.5000 but less than 0.5333. As heretofore observed, in the prior art devices the signal would be erroneously classified as greater than 0.5000. In the prior art devices such a decision is irrevocable, resulting in the erroneous encoding of 0.5000 rather than the required 0.4888. In accordance with my invention, however, the tolerance-distributing value of 0.0333 is initially subtracted from the input signal, with the result that a signal level of less than 0.5000 but greater than 0.4000 is compared instead of the measured signal above 0.5000. Thus, the signal is correctly classified as greater than 0.4000 and less than 0.5000 although the signal actually appears to be larger than 0.5000. Even though the 0.0300 error-tolerance-distributor is removed after the first decade comparison, a sufficient period of time will have elapsed by then so that the system transients will have decayed considerably. The signal may nevertheless still appear larger than the true value $T_n$. For example, assume that during the second decade comparison, the signal level appears to be greater than 0.4900 but less than 0.4932. In the prior art apparatus, the signal would be erroneously and irrevocably encoded as 0.4900 instead of its true instantaneous value of 0.4888. However, upon the subtraction of 0.0033, the signal appears to have a value greater than 0.4800 but less than 0.4900. Again, although the 0.0030 error-tolerance-distributor is removed at the end of the second decade classification, a further period of time has lapsed so that the read input analog signal will be still closer in value to its true value $T_n$. Thus, in the third decade classification a maximum allowable error of ±0.0003 is permitted. If the actual value of the signal is erroneously read as 0.4890 instead of the actual instantaneous value of 0.4888, the signal will be properly classified because of the substraction of 0.0003 during this encoding. During the fourth encoding decade, the final accuracy of the instrument is determined and accordingly no tolerance-distributing weight is substracted. However, by the time that the fourth decade has been selected for comparison, the time has elapsed for the first, second and third decades so that the system errors and signal fluctuations will have approached zero.

It may be readily observed that in accordance with my invention a quite simple, yet very convenient means is afforded for adding tolerance-distributing weights to the reference standards during certain of the decade conversions, thereby permitting the analog input signal to be read in the initial converter steps either above or below its true instantaneous value.

A PRELIMINARY DESCRIPTION OF THE CONTROL CIRCUIT

Each of the switches in the conductance adder is under the control of an associated flip-flop in the sequencer and control device 17. The control portion of this apparatus is shown in block diagram form in FIG. 3, each of the switches in the first decimal decade being connected to a flip-flop element 90. Although a purely mechanical connection is shown between each of these switches and the flip-flop element 90, it will be understood that an electrical connection would normally be made between the output of flip-flop element 90 to the input of suitable electronic switches serving as the conductance adder switches. Control flip-flop element 92 is connected to drive each of the switches 59–62 in the second decade. Control flip-flop element 93 is similarly connected to drive switches 69–72 in the third decade and control flip-flop element 94 is connected to actuate switches 79–82 in the fourth decade. Control flip-flop elements 91, 95 and 96 are connected respectively to switches 49, 86 and 88 of the error-tolerance-distributor circuitry.

Each of the control flip-flop elements 90, 92, 93 and 94 are actuated in sequence by a plurality of timing pulses $T_0$, $T_1$, $T_2$, $T_3$, $T_4$, $T_5$, $T_6$, $T_7$, $T_8$, $T_9$, $T_{10}$, $T_{11}$, $T_{12}$, $T_{13}$, $T_{14}$, $T_{15}$, $T_{16}$ and $T_{17}$. Each of these pulses is generated in the sequencing portion of the sequencer and control device 17 and this portion of the invention will be described in more detail hereinafter. Briefly, the periodically generated A and B pulses from the clock 20, supplied to the sequencer and control device 17 through connections 21*a* and 21*b*, serve to provide the sequence of seventeen pulses followed by a periodic repetition thereof.

Sequencing pulse $T_0$ is supplied to flip-flop elements 90, 92, 93 and 94 for resetting to zero all control flip-flops except the one which controls the "0.8000" conductance; this latter conductance is actuated by the $T_0$ pulse to begin a conversion cycle.

Also supplied to each control flip-flop element is the pulse $\delta_j$ through connecting line 38. As previously noted, this pulse occurs whenever the reference standard is too large and should be discarded. Accordingly, appropriate circuitry hereinafter described causes each sequencing pulse following $T_0$ to deactuate the too large reference standard. Thus, sequencing pulse $T_1$ will cause control element 90 to deactuate the "0.8000" conductance if a pulse $\delta_0$ is present when pulse $T_1$ occurs. The one-shot multivibrator is designed so that the $\delta_j$ pulses are of sufficient duration to last until after a succeeding sequencing pulse.

Sequencing pulse $T_1$ will also cause control element 90 to actuate the "0.4000" conductance. In similar manner, pulses $T_2$ and $T_3$ effect a comparison between the analog input and the "0.2000" and "0.1000" conductances.

The $T_0$ pulse is also supplied to control elements 91, 95 and 96 for actuating the tolerance-distributing conductances 54, 85 and 87. All of these conductances remain in circuit until pulse $T_4$. This pulse is supplied to control element 91 for disconnecting conductance 54 and to control element 92 for initially energizing the second decade. Pulse $T_4$ is also supplied to control element 90 for deactuating the "0.1000" conductance if a $\delta_3$ pulse is present.

In sequence, pulses $T_4$, $T_5$, $T_6$, and $T_7$ actuate the "0.0800," "0.0400," "0.0200" and "0.0100" conductances in the second decade. In similar manner, pulse $T_8$ disconnects conductance 85 at the beginning of the third encoding decade so as to remove the "0.0030" tolerance-distributing conductance. Pulse $T_8$ also disconnects the "0.0100" conductance if a $\delta_7$ pulse is present simultaneously. Pulses $T_8$–$T_{11}$ serve to actuate in sequence the reference standard conductances in the third encoding decade, and pulses $T_{12}$–$T_{15}$ serve to sequentially actuate the reference standard conductances in the fourth encoding decade. Pulses $T_{12}$ and $T_{16}$ deactuate the "0.0010" and "0.0001" conductances if $\delta_{11}$ and $\delta_{15}$ pulses are respectively present. At the beginning of the units decade, pulse $T_{12}$ also turns off flip-flop 96 for disconnecting the "0.0003" tolerance-distributing conductance.

A PRELIMINARY DESCRIPTION OF THE DIGITAL CODE CONVERTER

As hereinabove described, my invention provides a predetermined error tolerance for each comparison step or group of comparison steps by utilizing an increased classification span of succeeding steps beyond that of prior art encoders. In the specific embodiment illustrated in FIG. 3, the increased classification span is derived from digit combinations of the 8–4–2–1 BCD system which fall outside this code. Accordingly, at the end of an encoding sequence, the retained reference standard conductances do not necessarily correspond to the selected 8–4–2–1 BCD system. Therefore, one form or another of code conversion will be required before the output of the analog-to-digital converter is in useful form.

Numerous code conversion techniques known in the art may be employed to convert in an appropriate manner, the information contained in the converter. In some instances, the converter will be connected to the control elements 90, 92, 93 and 94 and convert therefrom directly into a decimal "readout" device. In the specific embodiment illustrated in FIG. 3, an alternative type of converter is shown wherein the particular flip-flops of the control elements are monitored by a digital code converter 30 and controlled thereby to assume a true 8–4–2–1 BCD relationship.

A preliminary description of the operation of the digital code converter 30 is as follows. As shown in FIG. 3, this converter comprises the four elements 99, 100, 101 and 102. Element 100 is connected to the output of control element 92 by lines 110, 111, 112 and 113. Element 101 is connected to the output of control element 93 by lines 114, 115, 116 and 117 and element 102 is connected to the output of control element 94 by lines 118, 119, 120 and 121. One of the functions of the elements 100–102 in the digital code converter 30 is to monitor the state of the flip-flops in the sequencer and control device 17 and to determine when the decades total greater than nine digits, e.g., whenever an "8" and a "2" reference standard conductance are simultaneously connected. In the circuitry shown, the status of each element in the sequencer and control device 17 is detected immediately after a sequence of control signals has been completed. Thus, after the second decade conversion has been completed, pulse $T_8$ is applied to element 100 to determine whether the flip-flops in element 92 total greater than nine digits. If a combination outside the BCD 8–4–2–1 system is shown, a control signal is transmitted back to the sequencer and control device 17 for rearranging the state of the flip-flops to conform to the 8–4–2–1 BCD system. In like manner, the status of the element 93 is monitored by applying sequencing pulse $T_{12}$ to element 101 of the digital code converter and the status of the element 94 is monitored by applying sequencing pulse $T_{16}$ to element 102 of the digital code converter.

In order to generate a BCD 8–4–2–1 code, a control element such as 92 which indicates a total greater than nine digits must have subtracted therefrom ten digits. This subtraction is afforded by proper control signals transmitted from converter element 100 to control element 92 by connecting line 125, from converter element 101 to control element 93 by connecting line 127, and from converter element 102 to control element 94 by connecting line 129.

The subtracted value must be made up by adding or carrying over one digit to the next higher decimal decade. For this purpose each control element is connected to appropriate circuitry in the digital code converted for adding the required one digit upon receipt of a "carry" pulse. For control elements 92, 93 and 94 this function is provided by converter elements 100, 101 and 102. For control element 90, this function is performed by converter element 99 coupled to control element 90 through lines 107, 108 and 109. The carry pulse from converter element 100 is coupled to control element 90 through lines 107, 108 and 109. The carry pulse from converter element 100 is coupled to control element 90 and converter element 99 by connecting line 126. The carry pulse from converter element 101 is coupled to control element 92 and converter element 100 by connecting line 128. The carry pulse from converter element 102 is coupled to control element 93 and converter element 101 by connecting line 130.

The operation of the digital code converter may be illustrated by a numerical example. In FIG. 1*b* and the description thereof, a typical example was assumed, wherein an analog signal having a true value $T_n$ of 0.5155 was initially incorrectly read as less than 0.5000 but greater than 0.4000. As heretofore noted, the first decimal decade selected the 0.4000 class, the second decimal decade the 0.1100 class, the third decimal decade the 0.0050 class and the fourth decimal decade the 0.0005 class. At the end of the encoding of the second decade, pulse $T_8$ is applied to element 100 of the digital code converter. This converter element then detects that the second decade is greater than 0.0900 since the "8," "2" and "1" digits have been simultaneously energized to provide the 0.1100 class. A signal is transmitted from element 100 through connecting line 125 to control element 92 for reversing the state of the "8" and the "2" flip-flops to subtract ten digits. The second decade then encodes only the "1" digit or 0.0100 class. Simultaneously, a carry signal is sent from element 100 through connecting line 126 to control element 90 and converter element 99 whereupon the control element 90 is advanced one digit, i.e., from the 0.4000 to the 0.5000 class. The final encoded value is thus the same, except that it is in the desired BCD 8–4–2–1 code with the first decade selecting the 0.5000 class, the second decade the 0.0100 class, the third decade the 0.0050 class and the fourth decade the 0.0005 class.

A PRELIMINARY DESCRIPTION OF THE OUTPUT REGISTER

The output register comprises four buffer registers, respectively labeled 135, 136, 137 and 138 in FIG. 3. Buffer register 135 is connected to the output of control element 90 in the sequencer and control device 17 by connecting lines 140, 141, 142 and 143. Buffer register 136 is similarly connected to control element 92 by lines 144, 145, 146 and 147. Lines 148, 149, 150 and 151 connect control element 93 to the input buffer register 137 and lines 152, 153, 154 and 155 connect control element 94 to the input of buffer register 138.

Sequencing pulse $T_{16}$ is applied to each of the converter elements for clearing the buffer registers immediately prior to a transfer of information. Sequencing pulse $T_{17}$ is applied to each of the converter elements for transferring the information from the control elements of the sequencer and control device 17 to the buffer registers, the latter registers storing the indicated digital value until a succeeding sequencing pulse $T_{16}$.

THE SEQUENCING CIRCUITRY

Figure 4:
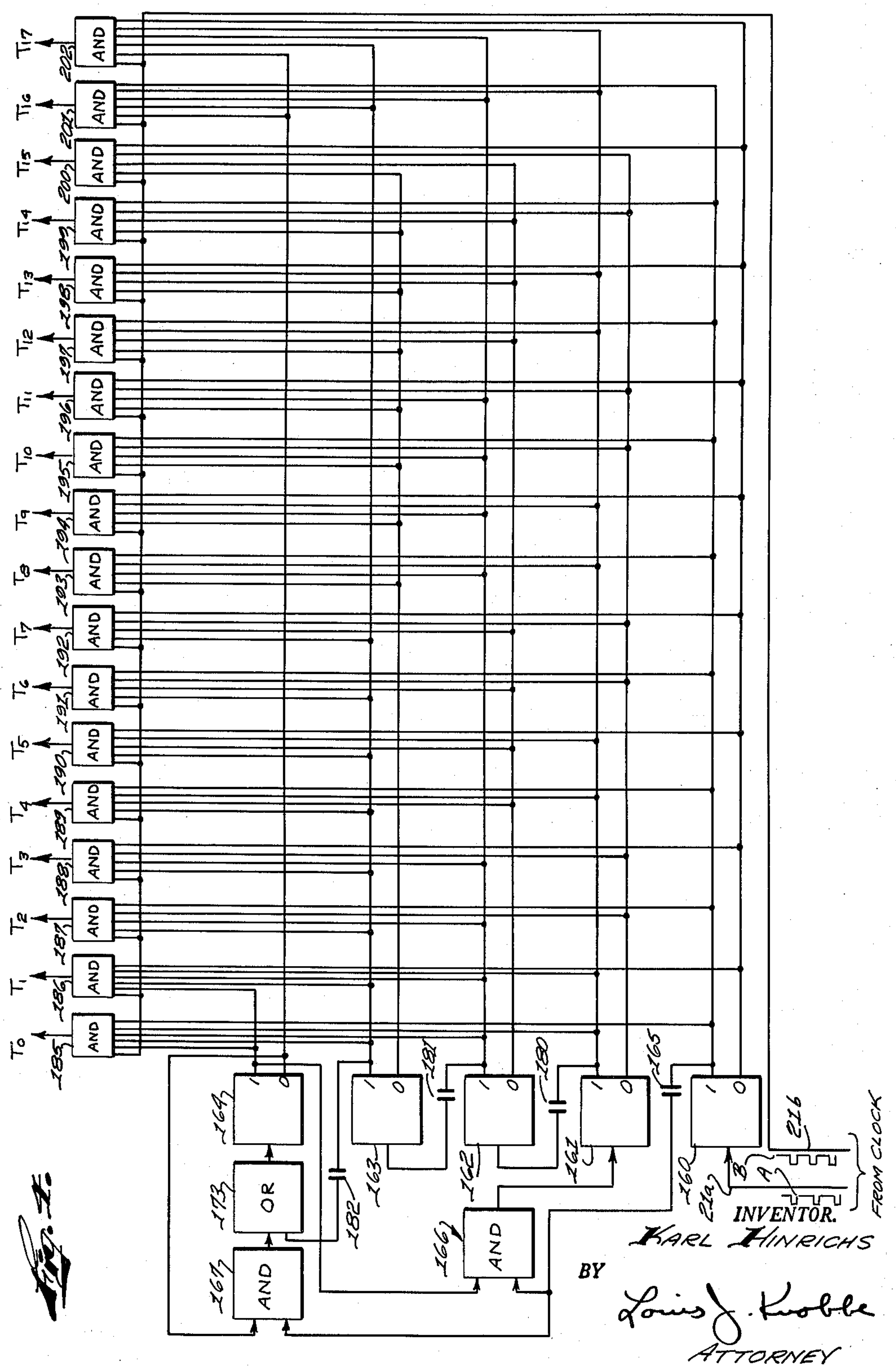
FIG. 4 is a schematic illustration of the sequencer portion of the sequencer and control of my invention.

The sequencer portion of the sequencer and control device 17 is shown in detail in FIG. 4. The sequencer comprises five flip-flops 160, 161, 162, 163 and 164. Each flip-flop is depicted with a single input and two outputs. A number of vacuum tube and transistor embodiments of flip-flops suitable for the sequencer are known in the art; typically each of the flip-flop outputs may be either at ground potential or at a positive potential. Each of the flip-flops will change to the respectively opposite state upon application of a positive input pulse. The sequencer is so designed that in the quiescent state in which all flip-flops are reset to their zero or "off" state, the left-hand output is at ground or zero and the right-hand output is at a positive voltage as shown for illustrative purposes. A logic "0" is represented by said zero output and a logic "1" is represented by said positive voltage.

Periodically spaced "A" pulses are supplied from the clock to flip-flop 160 through connecting line 21*a*. The normally "1" output of this flip-flop is connected through capacitor 165 to the inputs of "and" gates 166 and 167. The second input of "and" gate 166 is formed by the normally "1" output of flip-flop 164. A second input of "and" gate 167 is formed by the normally "0" output of flip-flop 164. The output of "and" gate 166 is connected to the input of flip-flop 161. The output of "and" gate 167 is connected to an "or" gate 173, the output of which is connected to the input of flip-flop 164. Capacitors 180, 181 and 182 are respectively connected between the normally "1" output of flip-flops 161, 162 and 163 and the inputs of flip-flops 162 and 163 and the "or" gate 173.

The operation of the circuit of FIG. 4 thus far described is as follows. Prior to the first "A" pulse from the clock through connecting line 21*a*, each of the flip-flops 160–164 are in their quiescent or "off" state, and accordingly, the left-hand output of flip-flop 160 is "0" and the right-hand output is "1." After the first "A" pulse, the state of flip-flop 160 is reversed so that the right-hand output will be zero, becoming positive or in its "on" state delivering a logic "1" again on the second "A" pulse.

The change in voltage from zero to positive occurring at the right-hand output of flip-flop 160 upon the second "A" pulse is differentiated by capacitor 165, resulting in a positive voltage pulse which is simultaneously applied to "and" gates 166 and 167. At this time, the second input of "and" gate 166 is also positive because flip-flop 164 is in its "off" state. Accordingly, the "and" gate permits the pulse output from flip-flop 160 to be connected through "and" gate 166 to the input of flip-flop 161. Thus, so long as flip-flop 164 is in its "off" state, a positive input pulse will be applied to flip-flop 161 after each two "A" pulses. Consequently, flip-flop 161 will change state with every two "A" pulses. Four "A" pulses into flip-flop 160 are required to change flip-flop 161 from its "off" state to its "on" state and back to its "off" state. Accordingly, a positive pulse will enter flip-flop 162 from differentiating capacitor 180 only after four pulses. In similar manner, flip-flop 163 will receive a positive input pulse only after eight "A" pulses. On the sixteenth input "A" pulse, flip-flop 163 will return to its "off" state and apply a positive pulse through capacitor 182 to "or" gate 173. "Or" gate 173 transmits this positive pulse to the input of flip-flop 164 whereupon flip-flop 164 is changed from its "off" state to its "on" state. Since flip-flop 164 is no longer in its quiescent or "off" state, positive pulses are no longer admitted through "and" gate 166 to the input of flip-flop 161. However, the pulses originating from capacitor 165 are now allowed to pass through "and" gate 167 because the second input of this "and" gate is now positive since it is connected to the left-hand output of flip-flop 164 which is now at a positive potential. Such a positive pulse will be supplied from capacitor 165 at the eighteenth "A" pulse. At this time, flip-flop 160 is returned to its "off" state, flip-flops 161, 162, 163 have been and remain in their "off" state and flip-flop 164 is returned to its "off" state because of the positive pulse applied to its input through "and" gate 167 and "or" gate 173. Flip-flops 160–164 are thus in their original or quiescent "off" state and accordingly the eighteenth "A" pulse is the first pulse of another sequence cycle.

It will thus been seen that the sequencer shown in FIG. 4 is in effect a decade counter having five counting states in which the normally full capacity of thirty-two is attenuated to seventeen by the circuitry hereinbefore shown and described.

The states of each of the flip-flops at each of the "A" pulses is tabulated as follows:

| "A" Pulse No. | Flip-Flop No. | | | | |
|---|---|---|---|---|---|
| | 160 | 161 | 162 | 163 | 164 |
| 0 | 0 | 0 | 0 | 0 | 0 |
| 1 | 1 | 0 | 0 | 0 | 0 |
| 2 | 0 | 1 | 0 | 0 | 0 |
| 3 | 1 | 1 | 0 | 0 | 0 |
| 4 | 0 | 0 | 1 | 0 | 0 |
| 5 | 1 | 0 | 1 | 0 | 0 |
| 6 | 0 | 1 | 1 | 0 | 0 |
| 7 | 1 | 1 | 1 | 0 | 0 |
| 8 | 0 | 0 | 0 | 1 | 0 |
| 9 | 1 | 0 | 0 | 1 | 0 |
| 10 | 0 | 1 | 0 | 1 | 0 |
| 11 | 1 | 1 | 0 | 1 | 0 |
| 12 | 0 | 0 | 1 | 1 | 0 |
| 13 | 1 | 0 | 1 | 1 | 0 |
| 14 | 0 | 1 | 1 | 1 | 0 |
| 15 | 1 | 1 | 1 | 1 | 0 |
| 16 | 0 | 0 | 0 | 0 | 1 |
| 17 | 1 | 0 | 0 | 0 | 1 |
| 0 or 18 | 0 | 0 | 0 | 0 | 0 |

Noting the tabulation above it will be apparent that 17 different combinations are afforded by the flip-flop states. "And" gates 185, 186, 187, 188, 189, 190, 191, 192, 193, 194, 195, 196, 197, 198, 199, 200, 201 and 202 are connected to the outputs of flip-flops 160 and 164 so that a pulse is gated through the individual "and" gates at a particular "A" pulse from the clock. Because the change in state of the flip-flops takes a finite time, one input signal for each of said "and" gates 185–202 is supplied by periodically spaced "B" pulses which are also generated by the clock and directed to the "and" gates through line **21*b***. As shown in the figure, the "B" pulses are slightly delayed with respect to the "A" pulses so as to guarantee that no change of state initiated by a preceding "A" pulse takes place simultaneously with or after the beginning of a "B" pulse. Consequently, the pulses indicated at the output of the "and" gate as $T_0$, $T_1$, $T_2$, $T_3$, $T_4$, $T_5$, $T_6$, $T_7$, $T_8$, $T_9$, $T_{10}$, $T_{11}$, $T_{12}$, $T_{13}$, $T_{14}$, $T_{15}$, $T_{16}$, $T_{17}$ are generated with substantially equal time intervals.

It may be noted in the table immediately above that all of the flip-flop states are distinctly defined by the first four flip-flops 160, 161, 162 and 163 with the exception of the pulse outputs $T_0$, $T_1$, $T_{16}$ and $T_{17}$ which are distinguishable only by means of noting the status of flip-flop 164. Consequently, the associated "and" circuits have an output of this flip-flop as an additional input.

THE CONTROL CIRCUITRY

FIGS. *5a* and *5b* are detailed illustrations of the control circuitry of the sequencer and control device 17 and the circuitry of the digital code convested 30. Singles generated by the sequencer and control device 17 are coupled to respective switches in the reference standard generator and the error-tolerance distributor for controlling the operation thereof. For example, control element 90 controls the switches of the first decimal decade. As shown in FIG. *5a* this control element comprises flip-flops 210, 211, 212 and 213 each having a pair of stable states producing a ground potential at one output ("0") and a positive potential at the other ("1"). In the quiscent or "off" state each of the flip-flops has a "0" left-hand output and a "1" right-hand input.

Each of the left-hand outputs is connected to a respective one of the reference standard switches 45–48. Thus, flip-flop 210 will actuate switch 45; flip-flop 211 will actuate switch 46, etc. When the respective flip-flop is in its "off" state, no output potential appears at its left-hand output and no potential will be applied to the associated switch; contrariwise, when a respective flip-flop is in its "on" state, a positive potential appears at its left-hand output for actuating the associated switch. At the beginning of an analog-to-digital conversion ($T_0$) it is necessary that all conductance adder switches previously actuated be returned to their "off" position with the exception of switch 45 connected to the initial reference (0.8000) conductance. Accordingly, timing pulse $T_0$ from the sequencer portion of the sequencer and control 17 (FIG. 4) is connected to each of the flip-flops 211, 212 and 213 and serves to reset each of these flip-flops to their "off" state. For achieving this reset, respective "and" gates 214, 215 and 216 have an input connected to respective left-hand outputs of flip-flops 211, 212 and 213; other inputs of these "and" gates are connected to $T_0$. The outputs of the "and" gates are connected to the inputs of flip-flops 211–213 through respective "or" gates 217, 218 and 219. The pulse $T_0$ will be gated through an "and" gate only whenever a positive voltage is applied to the "and" gate input from the left-hand output from a flip-flop; i.e., only whenever a flip-flop is in the "on" state. For those flip-flops in an "on" state, the pulse $T_0$ will appear at their inputs and cause the flip-flop states to reverse to the desired "off" or reset state.

Since pulse $T_0$ is also the initial pulse of analog-to-digital conversion cycle, this pulse should cause flip-flop 210 to remain in the "on" state, or to change to the "on" state. "And" gate 220 has one input connected to $T_0$ and another input connected to the right-hand output of flip-flop 210. The output of "and" gate 220 is connected to the input of flip-flop 210 through "or" gate 225. The pulse $T_0$ will be gated through "and" gate 220 only when a positive potential appears at the right-hand output of flip-flop 210; i.e., only when flip-flop 210 is in its "off" state. Thus, if flip-flop 210 is in its "off" state, the pulse $T_0$ will properly reverse the state of this flip-flop so as to actuate the "0.8000" conductance; if flip-flop 210 is in its "on" state, the pulse $T_0$ will not be allowed to reverse the flip-flop state so that the "0.8000" conductance remains in circuit.

After a comparison has been made between the "0.8000" reference value and the analog input, a pulse $\delta_0$ will appear on line 38 if the reference value is greater in magnitude than the analog input. The pulse $\delta_0$ is connected to inputs of "and" gates 226, 227, 228 and 229 of element 90. As hereinabove noted, the pulse $\delta_j$ is of sufficient duration to continue until after a succeeding sequencing pulse. Thus, if both the pulse $\delta_0$ and $T_1$ are at the input of "and" gate 226, this gate will open and allow the pulse $T_1$ to disconnect the "0.8000" reference standard. If $\delta_0$ is not present (i.e., a comparison has shown the "0.8000" reference to be smaller than the analog input) "and" gate 226 remains closed and does not pass pulse $T_1$. When $\delta_0$ is present, an output pulse from "and" gate 226 is applied to the input of flip-flop 210 through "or" gate 225. Therefore, the flip-flop 210 will be caused to reverse its state by pulse $T_1$ when the comparator supplied pulse $\delta_0$ indicating that the "0.8000" reference was to be discarded.

Timing pulses $T_1$, $T_2$, and $T_3$ are respectively connected to flip-flops 211, 212 and 213 through respective "or" gates 217, 218 and 219 for actuating in sequence the "0.4000," "0.2000" and "0.1000" reference standards.

Pulses $T_2$, $T_3$ and $T_4$ are respectively connected to the inputs of "and" gates 227, 228 and 229. Outputs of these "and" gates are respectively connected to flip-flops 211, 212 and 213 through "or" gates 217, 218 and 219. "And" gates 227–229 functions in a manner similar to that of "and" gate 226, allowing the timing pulses to deactuate the previous reference whenever a $\delta_j$ pulse indicates that it should be discarded. For example, when pulse $T_2$ is supplied by the sequencer, flip-flop 212 is actuated to connect the "0.2000" reference standard. Simultaneously, the "0.4000" reference standard will be discarded if the $\delta_1$ pulse is present at the input of "and" gate 227. If the $\delta_1$ pulse is not present, it indicates that the "0.4000" reference standard should remain in circuit and be subtracted from the analog input.

Control elements 91, 95 and 96 each include an "or" gate having an output connected to the input of a flip-flop stage. Thus, element 91 includes "or" gate 230 and flip-flop 231. "Or" gate 230 has two inputs, one of which is connected to the $T_0$ sequencing pulse and the other of which is connected to the $T_4$ sequencing pulse. The left-hand output of flip-flop 231 drives switch 49 which actuates the "0.0300" tolerance-distributing conductance. Element 95 includes "or" gate 255 and flip-flop 256. "Or" gate 255 has two inputs, one which is connected to the $T_0$ sequencing pulse and the other of which is connected to the $T_8$ sequencing pulse. The left-hand output of flip-flop 256 drives switch 49 which actuates the "0.0030" tolerance-distributing conductance. Control element 96 includes "or" gate 257 and flip-flop 258. "Or" gate 257 has two inputs one of which is connected to the $T_0$ sequencing pulse and the other which is connected to the $T_{12}$ sequencing pulse. The left-hand output of flip-flop 258 drive switch 88 which actuates the "0.0003" tolerance-distributing conductance.

The operation of the control elements driving the error-tolerance distributor is as heretofore described. Ssquencing pulses $T_0$ changes flip-flops 231, 256 and 258 to their "on" state whereby a positive voltage is applied to error-tolerance distributor switches 49, 86 and 88 for actuating same and inserting a total tolerance-distributing conductance of 0.0333 in circuit. Flip-flop 231 and associated switch 49 remain "on" until sequencing pulse $T_4$. This latter pulse returns flip-flop 231 to its "off" state thus disconnecting the "0.0300" tolerance-distributing conductance. Flip-flop 231 therefore remains "on" during the first decimal decade and "off" during the remainder of the encoding cycle. Flip-flop 256 and associated switch 86 remain "on" until sequencing pulse $T_8$. This latter pulse returns flip-flop 256 to its "off" state and thus disconnects the "0.0030" tolerance-distributing conductance. Flip-flop 256 therefore remains "on" during the first and second decimal decades and "off" during the remainder of the encoding cycle. Flip-flop 258 and associated switch 88 remain "on" until a sequencing pulse $T_{12}$. This latter pulse returns flip-flop 258 to its "off" state and thus disconnects the "0.0030" tolerance-distributing conductance. Flip-flop 258 therefore remains "on" during the first, second and third decimal decades and "off" during the fourth or last decimal decade.

The second, third and fourth decades of the control portion of the sequencer and control device 17 are similar to the first decade. For example, element 92 comprises flip-flops 235, 236, 237 and 238 having their left-hand outputs respectively connected to conductance adder switches 59, 60, 61 and 62 for actuating same when a respective flip-flop is in the "on" state.

"And" gates 240, 241, 242 and 243 each have one input connected to sequencing pulse $T_0$ and another input respectively connected to the left-hand outputs of flip-flops 235–238. The outputs of each of these "and" gates are respectively connected to the inputs of flip-flops 235–238 through respective "or" gates 245, 246, 247 and 248. As in the first decade these "and" gates allow the $T_0$ sequencing pulse to reset each of the flip-flops to their "off" state.

Flip-flops 235–238 are sequentially turned "on" by respective sequencing pulses $T_4$, $T_5$, $T_6$ and $T_7$ which are respectively connected to the inputs of the flip-flops through "or" gates 245–248. Upon the comparison between the analog input signal and a reference value a pulse $\delta_j$ denotes whether the reference value was too large and therefore should be disconnected. Pulse $\delta_j$ is therefore connected to inputs of "and" gates 250, 251, 252 and 253. Other inputs of these "and" gates are respectively connected to sequencing pulses $T_5$, $T_6$, $T_7$ and $T_8$. The outputs of these "and" gates are respectively connected to flip-flops 235, 236, 237 and 238 through respective "or" gates 245, 246, 247 and 248. Thus, upon occurrence of, for example, the pulse $T_5$ flip-flop 236 and the "0.0400" reference standard conductance will be turned "on." Preceding flip-flop 235 and conductance "0.0800" will remain "on" or be turned "off" depending upon whether a pulse $\delta_4$ is applied to "and" gate 250 when pulse $T_5$ occurs.

THE DIGITAL CODE CONVERTER CIRCUITRY

In FIG *5a* is shown in detail the proportion of the digital code converter 30 connected to the outputs of the first and second decimal decades. This converter monitors the control elements of the sequencer and control device so as to provide output signals encoded in an 8–4–2–1 BCD relationship. For convenience, element 100 of the digital code converter will be first described. This element is connected to the output of element 92 of the sequencer and control 17. This element controls the encoding cycle during the second decimal decade.

Element 100 includes "and" gates 260 and 261. The normally "0" outputs of flip-flops 235 and 237 are connected by respective connecting lines 110 and **112*a* to the input of "and" gate 260. Pulse $T_8$ is also connected to the input of "and" gate 260. The output of "and" gate 260 is connected to an input of "or" gate 262. The output of this "or" gate is connected to the inputs of flip-flops 235 and 237 through connecting line 125*a* and respective "or" gates 245 and 247. The output of "or" gate 262 is also connected to the input of "or" gate 263**.

The normally "0" output of flip-flops 235 and 236 and the normally "1" output of flip-flop 237 are connected by respective connecting lines 110, 111 and **112*b* to the input of "and" gate 261. Pulse $T_8$ is also connected to the input of "and" gate 261. The output of "and" gate 261 is connected to another input of "or" gate 262 and to the input of flip-flop 236 through connecting line 125*b* and "or" gate 246**.

The operation of this portion of the digital code converter is as follows: As noted above, the digital code converter 100 must detect whenever the second decimal decade encodes a digital combination of ten or greater. These combinations are 8+4+2+1, 8+4+2+0, 8+4+0+1, 8+4+0+0, 8+0+2+1 and 8+0+2+0. For proper conversion, the "1" digit need not be converted. All combinations of the "8" and "2" digits may be converted by reversing the state of the "8" and "2" flip-flops (in the second decade these are flip-flops 235 and 237) to their "off" states and applying a carry pulse to the preceding, or first decimal decade. Thus, 8+4+2 becomes 0+4+0+carry and 8+0+2 becomes 0+0+0+carry. A combination of the "8" and "4" digits without a "2" digit requires reversing the state of the "8," "4" and "2" flip-flops (in the second decade these are flip-flops 235, 236 and 237) and applying a carry pulse. Thus, the "8" and "4" flip-flops are changed to their "off" state, while the "2" flip-flop is changed to its "on" state; i.e., 8+4+0 becomes 0+0+2+carry.

"And" gate 260 connected to the "0.0800" flip-flop 235 of the "0.0200" flip-flop 237 detects a combination of the "8" and "2" digits at the time of the $T_8$ sequencing pulse (which terminates the second decade conversion). A pulse is then gated through "and" gate 260 and "or" gate 262 through connecting line **125*a* to reverse the states of the "0.0800" flip-flop 235 and the "0.0200" flip-flop 237. A carry pulse is also applied to "or" gate 263 for application through connecting line 126 to the preceding first decade element 90 and preceding digital code converter element 99**.

"And" gate 261 detects the combination of the "0.0800" and "0.0400" flip-flops "on" and the "0.0200" flip-flop "off." A pulse is then gated through "and" gate 261 and "or" gate 262 through connecting lines **125*a* to reverse the states of the "0.0800" flip-flop 235 and the "0.0200" flip-flop 237, and to "or" gate 263 as a carry pulse to the first decade. The pulse gated through "and" gate 261 is also conducted through connecting line 125*b*** to reverse the state of the "0.0400" flip-flop.

The carry pulse from the second decimal decade is applied to the first decimal decade through connecting line 126. This pulse indicates to the higher decade that an additional digit must be added; e.g., an additional "0.0100" conductance in the first decade, so as to compensate for the 0.0100 no longer encoded in the second decade because of the action of the digital code converter element 100. If the "1" flip-flop 213 is "off" in the first decade, the additional digit may be added by simply changing the "1" flip-flop to its "on" state. Thus, connecting line 126 is connected directly to flip-flop 213 through "or" gate 219 so that a carry pulse will change the state of flip-flop 213.

However, the "1" flip-flop may already have been in the "on" state so that a carry pulse will cause it to change to the "off" state. In this case, a digit will not be added; rather, a digit will be subtracted whereby two digits must then be added. In like manner, the "4" flip-flop must be turned "on" when the carry pulse will change the state of flip-flop 213.

Element 99 of the digital code converter includes capacitors 266, 267 and 268. One plate of capacitor 266 is connected to the normally "0" output of flip-flop 211 through resistor 271 and connecting line 107; one plate of capacitor 267 is connected to the normally "0" output of flip-flop 212 through resistor 272 and connecting line 108; and one plate of capacitor 268 is connected to the normally "0" output of flip-flop 213 through resistor 273 and connecting line 109.

The purpose of the aforesaid capacitors 265–268 is to hold the voltage of the flip-flop outputs for some time after a flip-flop has changed state. When, for example, a flip-flop changes from zero to a positive voltage, charging current flows through the series resistor to the capacitor and it will take an interval of time before the voltage at the previously grounded capacitor plate approaches the final output value of the flip-flop. As carry pulses may appear only at intervals at least as long as four sequencing pulses, the time constant of a resistor capacitor combination may be fairly long. Although capacitors are shown as the storage devices, it will be apparent to those skilled in the art that other devices having similar characteristics may be substituted therefor. The purpose of these R-C circuits will become clear in the following paragraphs.

Element 99 of the digital code converter further includes "and" gates 275, 276 and 277. "And" gate 275 is adapted for detecting the condition wherein a carry pulse is received when the "1" flip-flop 213 is already in the "on" condition. Then, the left-hand output of flip-flop 213 was positive shortly before or at the time of the carry pulse so that the upper plate of capacitor 268 remains positive for some time after flip-flop 213 changes state. This positive voltage is connected to the input of "and" gate 275 through resistor 280; the positive carry pulse is also connected as an input to this "and" gate so that a positive pulse is gated through "and" gate 275 to the input of flip-flop 212, through "or" gate 218, to add two digits. Thus, although flip-flop 213 changes state immediately upon the occurrence of a carry pulse, the R-C circuit associated with this flip-flop (resistor 273 and capacitor 268) affords a means for reading the state of this flip-flop just prior to the carry pulse.

If the "1" and "2" flip-flops are both "on" when a carry pulse is received, it was noted heretofore that the "4" flip-flop must then be actuated and the "1" and "2" flip-flops turned "off." For this purpose, "and" gate 276 is connected to the upper plate of capacitor 267 through resistor 281. Another input of "and" gate 276 is connected to the output of "and" gate 275. Since the upper plate of capacitor 267 will be positive when the "2" flip-flop was "on" just prior to the carry pulse, and the output of "and" gate 275 is positive when the "1" flip-flop was "on" just prior to the carry pulse, the output of "and" gate 276 indicates that the "4" flip-flop should be actuated. Therefore, the output of "and" gate 276 is connected to the input of flip-flop 211 through "or" gate 217. The carry pulse directly turns "off" the flip-flop 275 and the "2" flip-flop is turned "off" by the output of "and" gate 275.

If the "1," "2" and "4" flip-flops are all "on" when a carry pulse is received, the "8" flip-flop must be actuated and the "1," "2" and "4" flip-flops turned "off." Accordingly, "and" gate 277 has an input connected to the upper plate of capacitor 266 through resistor 282 and another input connected to the output of "and" gate 276. The upper plate of capacitor 266 is positive when the "4" flip-flop 211 was "on" just prior to the carry pulse. The output of "and" gate 276 is positive when the "2" and "1" flip-flops 212 and 213 were "on" just prior to the carry pulse. The output of "and" gate is therefore positive when the "1," "2" and "4" flip-flops were "on" just prior to the carry pulse. This output is connected to flip-flop 210 through "or" gate 225, for turning this flip-flop "on." The "1" flip-flop is turned "off" directly by the carry pulse; the "2" flip-flop is turned "off" by the output of "and" gate 275 and the "4" flip-flop is turned "off" by the output of "and" gate 276.

In the first decade the "8" flip-flop will never be "on" simultaneously with either or both the "2" or "4" flip-flops since this indicates a number above 0.9999 and above the range of a four decade, binary decimal coded converter.

Similarly, if the "8" and "1" flip-flops in the first decade are "on" simultaneously, a carry pulse will not be received over connecting line 126 since this also would indicate an analog input beyond the range of a four decade analog to binary decimal coded converter. However, in the second decade, a carry pulse may be received from the third decade over connecting line 128 when the "8" and "1" flip-flops are both "on" since a carry may be sent to the next highest or first decimal decade. Thus, element 100 of the digital code converter has an additional "and" gate 285 which detects when the "8" and "1" flip-flops of the second decade are both "on" when a carry pulse is received.

"And" gate 285 has one input connected to the upper plate of capacitor 286 through resistor 287. The upper plate of this capacitor is also connected to the output of the "8" flip-flop 235 through resistor 288. The lower plate of capacitor is grounded.

A second input of "and" gate 285 is connected to the upper plate of capacitor 289 through resistor 290. The upper plate of this capacitor is connected to the output of the "1" flip-flop 238 through resistor 291. The R-C circuits 288, 286 and 291, 289 function in an identical manner to the R-C circuits in the digital code converter element 99, allowing the state of the "8" and "1" flip-flops to be read just prior to a carry pulse. The upper plates of respective capacitors 286 and 289 are positive when the flip-flops 235 and 238 are "on" just prior to a carry pulse. Thus, a carry pulse from line 128 is applied to a third input of "and" gate 285 resulting in a positive pulse at the output of "and" gate 285 which turns "off" the "8" flip-flop 235 and applies a carry pulse to connecting line 126 through "or" gate 263. The "1" flip-flop 238 is turned "off" directly by the carry pulse on connecting line 128. A carry pulse from the third decimal decade therefore properly results in a carry pulse to the first decade when the second decade is already filled, i.e., already encodes a total of nine digits. The aforementioned circuitry subtracts nine digits in the second decade and adds one digit in the first decade.

The remaining circuitry in digital code converter element 100 is similar to previously described circuitry in the digital code converter element 99 and performs analogous functions.

Although a carry pulse may be received in the second decade when it totals nine digits (0.0900), a higher total will never be encoded just prior to receipt of a carry pulse. This operation is obviated by the additional circuitry in the element 100 which detects a total of greater than 0.0900 immediately upon termination of the encoding of the second decade (sequencing pulse $T_8$) and immediately converts the encoded bits in the second decade to conform to the true 8–4–2–1 binary coded decimal code. This conversion is therefore entirely completed prior to the receipt at sequencing pulse $T_{12}$ or $T_{16}$, of a carry pulse from the third or fourth decades.

It may further be noted that a carry pulse from the third decade over connecting line 128 is connected immediately to the first decade over connecting line 126 when the second decade is filled; i.e., only an "and" gate is in series with the carry pulse and passage of the pulse does not wait any flip-flop actuation.

As shown in FIG. *5b*, element 101 of the digital code converter 30 which is connected to the output of control element 93 is identical to element 100 heretofore described. Element 102 of the digital code converter which is connected to the output of control element 94 is also similar to element 100. Code conversion element 102 is connected to the lowest order decade. Since there are no succeeding decades, no carry signals are applied to element 102 with the result that, as shown, no storage and related "and" and "or" gates are required in this converter element.

THE OUTPUT REGISTER CIRCUITRY

After an encoding cycle has been completed, the states of the control flip-flops in the sequencer and control device 17 are indicative of the magnitude of the analog input in true 8–4–2–1 binary coded decimal code. If this output could be read in a very brief period of time, the control flip-flops 210–213 in element 90 and analogous control flip-flops in elements 92, 93 and 94 could themselves be utilized as the output indicating means.

However, the output information may often be used in such a manner that a very quick reading is either impossible, or quite difficult. Since a complete encoding requires 17 sequencing pulses ($T_0$–$T_{16}$) it will be apparent that if an additional output storage means were provided, the output could be read over a period as long as 17 sequencing pulses. This additional time may be used, for example, to feed the information to a digital computer in serial form, one bit at a time.

In order to provide this storage function, an output register 33 is provided. This register has previously been shown in block diagram form in FIG. 3. FIG. 6 shows a detailed illustration of this register.

As shown in FIG. 6, element 135 of the output register includes "and" gates 300, 301, 302 and 303 each having an input connected to sequencing pulse $T_{16}$. The output of each of these "and" gates is connected to the input of respective flip-flops 305, 306, 307 and 308 through respective "or" gates 310, 311, 312 and 313.

The flip-flops in each of the output register elements serve as a buffer register into which the information from the control portion of the sequencer and control is transferred at the end of an encoding cycle. Prior to a transfer, each of these registers must be "cleared" to erase the previously registered output. This clearing function may be performed at any convenient time during an encoding cycle; for example, in the register shown in FIG. 6, the sequencing pulse $T_{16}$ is connected to each register for this purpose. In order that each flip-flop shall be in a zero state after the occurrence of this pulse, an output from the normally zero outputs of each of the flip-flops 305–308 is returned to a respective "and" gate 300–303 as an input. Therefore, the pulse $T_{16}$ will be gated through only those "and" gates having an input connected to an "on" flip-flop; therefore, only the "on" flip-flops will change state upon application of pulse $T_{16}$.

The information in the control portion of the sequencer and control device is transferred to flip-flops 305–308 by lines 140–143. Thus, line 140 connects the normally zero or left-hand output of flip-flop 210 to the input of "and" gate 315 output register element 135. In like manner, connecting line 141 connects flip-flop 211 to "and" gate 316, connecting line 142 connects flip-flop 212 to "and" gate 317, and connecting line 143 connects flip-flop 213 to "and" gate 318.

Each of the "and" gates 315–318 serve to gate the information from the sequencer and control device 17 into the output register 33 at the end of the encoding cycle. For this purpose each of these "and" gates has an additional input to which sequencing pulse $T_{17}$ is supplied, and an output connected to a respective buffer register flip-flop 305–308 through respective "or" gates 310–313.

Pulse $T_{17}$ occurs in sequence just after all encoder decades have been actuated. This pulse transfers the information in the control element 90 by applying a positive pulse through each of the "and" gates 315–318 which are connected to "on" flip-flops in the control element. The positive pulses allowed through one or more of the "and" gates 315–318 cause the associated buffer register flip-flops to change to an "on" state thereby exactly duplicating in flip-flops 305–308 the state of the control flip-flops 210–213, i.e., the flip-flops in output register element 135 are in the identical "0" and "1" states as the control flip-flops in the first decade of the sequencer and control 17. This information will remain stored in the output register until sequencing pulse $T_{16}$ of the immediately following analog-to-digital conversion cycle.

Elements 136, 137 and 138 of the output register 33 are shown in detail in FIG. 6. These elements are identical in structure and function to previously described element 135, element 136 affording a storage of the information in the second decade, element 137 affording an information storage for the third decade and element 138 affording an information storage for the fourth decade.

My invention therefore provides an analog-to-digital converter characterized by improved accuracy and high digitizing speeds. This unique invention recognizes that electronic systems have finite response times and accordingly, permits substantial errors to be made in the initial digitizing steps without affecting the accuracy of the final digitized output. Converters constructed according to my invention can therefore be operated at substantially higher operating speeds with improved accuracy.

Although the specific embodiment of my invention which has been shown and described in detail utilized the 8–4–2–1 BCD relationship, it is to be clearly understood that the same is by way of illustration and example only since it is apparent that a wide variety of digital codes may be utilized. In particular, several additional representative codes in which my invention may be encoded are tabulated in Tables II, IV and V hereinabove. Likewise, the particular structural details in the specific embodiment are by way of illustration and example only, the spirit and scope of my invention being limited only by the terms of the appended claims.

I claim:

1. An analog-to-digital converter comprising a source of selectively addible, digitally weighted electrical quantities; control means connected to said source for selecting said digitally weighted quantities and providing an indication thereof; means for selectively generating error tolerance distributing electrical quantities; summing means for selectively adding said error tolerance distributing electrical quantities and said digitally weighted electrical quantities; comparator means for comparing the analog input signal with the output of said summing means to provide an output signal indicative of whether the analog input signal is larger or smaller than the output of said summing means; means connecting the output of said comparator means to said control means so that said control means selects those digitally weighted electrical quantities which cause the difference between said analog input signal and the output of said summing means to approach zero, said control means upon completion of a conversion cycle being adapted by its electrical quantity indication to manifest digital values corresponding in combination to the value of said analog input signal.

2. In an analog-to-digital encoder in which the value of the analog signal may initially appear as having a value other than its true value; means for generating reference standards defining a plurality of primary order classes, said primary order classes dividing the range in which said analog signal can occur into a finite number of classes; means for preliminarily determining within which primary class the apparent analog value lies; means for generating reference standards defining a plurality of secondary classes, part of which subdivide said preliminary selected primary class into a plurality of subclasses and at least one of which is outside the class limits of the preliminary selected primary class; means for determining within which secondary class the apparent analog value lies; and means for converting the preliminary classification so that the final classification contains no secondary classes outside of the class limits of a selected primary class.

3. An analog-to-digital converter comprising a master attenuator adapted, when supplied with an energizing voltage and when actuated by control signals, to provide an output electrical quantity representing an accumulation of incremental electrical quantities each proportional to the energizing voltage and respectively selected by said control signals from a succession of said incremental electrical quantities which are the analog equivalents to a predetermined number system, said number system having the characteristic that certain increment combinations fall outside the selected number systems; a comparator responding to said output electrical quantities and to an analog input signal to be converted; a control element responsive to said comparator which actuates said master attenuator with control signals which select appropriate incremental electrical quantities of said master attenuator to render said output electrical quantity a closer and closer approximation to said analog input signal, said control means adapted upon completion of a conversion cycle to manifest by its then attained condition the value of said quantity to be measured; and a digital code converter coupled to said control element for monitoring the selected incremental electrical quantities and responsive to the retention of predetermined incremental electrical quantities falling outside said selected number system for causing said control element to manifest in said predetermined number system the value of said analog input signal to be converted to digital form.

4. In a system for manifesting the value of an analog input signal to be measured as a digital output encoded in binary coded decimal, means including a plurality of decades each providing an output electrical quantity representing an accumulation of incremental electrical quantities which are the analog equivalents to a predetermined binary code, each decimal digit being represented by the output electrical quantity of one of said decades, at least one of said decades adapted for producing an accumulation of incremental electrical quantities greater than the decimal digit associated therewith and conversion means responsive thereto, means for providing a total electrical quantity representing the total incremental electrical quantities accumulated in said decades, means responding to said total electrical quantity and to the analog signal to be measured for selecting those incremental electrical quantities in said decades which render said total electrical quantity a closer and closer approximation to said analog signal, said conversion means being adapted for rearranging the incremental electrical quantities of the decade with which it is responsive to an accumulated value lower than the decimal digit associated therewith, means connecting said conversion means to the decade immediately preceding the decade to which it is responsive, said conversion means being adapted to rearrange the incremental electrical quantities in said immediately preceding decade so that said total electrical quantity remains substantially constant.

5. An analog-to-digital converter comprising a conductance adder having an input, an output and a common terminal, a first plurality of impedances each having one end connected to said output terminal, a second plurality of impedances each having one end connected to said output terminal, said first and second pluralities of impedances being selected to have conductance values corresponding to a predetermined number system, first switching means for selectively connecting the other end of each first impedance to either of said input and common terminals, second switching means for selectively connecting the other end of each second impedance to either of said input and common terminals, an additional impedance selected to have a predetermined error tolerance conductance value having one end connected to said output terminal, third switching means for selectively connecting the other end of said additional impedance to either of said input and common terminals, a reference voltage connected between said input and said common terminals, a comparator connected to said output terminal and the analog signal to be converted, first control means connected to said first switching means for causing said first switches to sequentially connect the other end of each first impedance to said input terminal, means connected to said third switching means for causing said third switch means to connect the other end of said additional impedance to said input terminal to cause the apparent value of said analog signal to be lower than its actual value during the period that said first control means is causing said sequential operation, second control means connected to said second switching means for causing said second switch means to sequentially connect the other end of each second impedance to said input terminal after the period that said first control means is causing said sequential operation, and means connecting the output of said comparator to said first and second control means for causing those first and second impedances to remain connected to said input terminal which produce an electrical quantity at said output terminal which is a closer and closer approximation to said analog signal to be converted.

6. An analog-to-digital converter comprising first means for generating first reference standards digitally weighted according to a predetermined number system, second means for generating second reference standards digitally weighted according to said predetermined number system, means for generating a tolerance-distributing value, means for sequentially comparing said first reference values with an analog signal to be converted, means for adding said tolerance-distributing value to said first reference standards during the period that the analog signal is being sequentially compared with said first reference standards to cause the apparent value of said analog signal to be lower than its actual value, and means for sequentially comparing said second reference standards with the analog signal after the period that the analog signal is sequentially compared with said first reference standards.

7. An analog-to-digital converter wherein the analog to be measured is compared with a quantity progressively changing by increments in accordance with the concurrent progressively changeable condition of a control means adapted upon completion of measuring to manifest by its then attained condition the value of said analog; the improvement with said converter comprising means for weighting the values of said increments in accordance with a predetermined number system, said number system having the characteristic that certain combinations of said incremental quantities exceed a selected total number greater than any individual number in said system; and means for adding an error tolerance distributing value to said incremental quantities during a portion of said conversion.

8. An analog-to-digital converter wherein an analog to be measured is compared with a quantity progressively changing by increments in accordance with the concurrent progressively changeable condition of a control means adapted upon completion of measuring to manifest by its then attained condition the value of said analog, said incremental quantities being digitally weighted according to a predetermined number system; the improvement with said converter comprising means for adding an error tolerance distributing value to said incremental quantities during a portion of said conversion, and means for converting the manifestation of said control means so that it corresponds to said predetermined number system.

9. In an analog-to-digital converter in which a plurality of reference standards are weighted according to the 8–4–2–1 binary coded decimal system, said reference standards being divided into decades corresponding to the decimal digits, control means for sequentially comparing the analog input signal with said reference standards and selectively retaining and discarding same to accumulate a value which differs from said analog input less than any of said reference standards; the improvement comprising a first coincidence detector responding to the retention of the "8" and the "2" reference standards in a decade, said first coincidence detector being coupled to said control means for causing the discarding of said "8" and "2" reference standards and the retention of an additional digit in the next higher decade, a second coincidence detector responding to the retention of the "8" and "4" reference standards and the discarding of the "2" reference standard, said second coincidence detector being coupled to said control means for causing the discarding of the "8" and "4" reference standards and the retention of the "2" reference standards and the retention of an additional digit in the next higher decade.

10. In an analog-to-digital converter in which a first group of reference standards are weighted according to a predetermined number system and represent a first decimal digit and a second group of reference standards are weighted according to a predetermined number system and represent a second decimal digit next higher in order to said first decimal digit, said reference standards being sequentially compared with an analog input signal and selectively retained and discarded to accumulate a value which differs from said analog input signal less than any of said reference standards; the improvement comprising first means responsive to the retention of a predetermined combination of two reference standards in said first group of reference standards, second means coupled to said first means for discarding said two reference standards, and third means coupled to said first means and said second group of reference standards for retaining an additional reference standard therein.

11. In an analog-to-digital converter in which a plurality of reference standards weighted according to a predetermined number system are sequentially compared with an analog input signal and selectively retained and discarded to accumulate a value substantially equal to said analog input signal, the improvement comprising means for detecting whenever a predetermined combination of two low order reference standards are retained, and means responsive to said detection means for discarding said retained reference standards and causing another of said reference standards of high order to be retained.

12. An analog-to-digital converter comprising means for generating a first group of first, second, third and fourth reference standards and a second group of first, second, third and fourth reference standards weighted according to a predetermined number system, means for comparing said reference standards with the analog input signal and selecting those reference standards which when added are equal to a value which differs from said analog input less than any of said reference standards, first coincidence means responsive to the selection of the first and third reference standards of said first group, second coincidence means responsive to the selection of first and second reference standards of said first group when said third reference standard of said first group is not selected, and means responsive to said coincidence means for causing at least one of the reference standards in said second group to be selected.

13. An analog-to-digital converter comprising means for generating a plurality of reference standards weighted according to a predetermined number system, means for comparing said reference standards with the analog input signal and selecting those reference standards which when added are equal to a value which differs from said analog input less than any of said reference standards, coincidence means responsive to the selection of two of said reference standards when another of said reference standards is not selected, and means responsive to said coincidence means for selecting another of said reference standards of higher order than any single one of said two reference standards and said another of said reference standards.

14. In analog-to-digital converter in which a plurality of reference standards are weighted according to a binary coded decimal system, said reference standards being divided into decades corresponding to the decimal digits, means for comparing the analog input signal with said reference standards and selecting those reference standards which when added are equal to a value which differs from said analog input less than any of said reference standard, means responsive to each decade except the highest order decade for detecting whenever the reference standards selected within a decade add to more than nine digits, means for decreasing by ten digits any such decade which exceeds nine digits and increasing the next higher decade by one digit.

15. An analog-to-digital converter comprising a source of selectively addible electrical quantities which vary in amplitude according to the 8–4–2–1 binary coded decimal system, said system having the characteristic that certain combinations of quantities total greater than nine digits and fall outside said system, control means connected to said source for selecting the quantities and providing an indication thereof, means for comparing an analog signal and certain of said selected quantities to provide a difference quantity, means connecting said difference quantity to said control means to select those certain quantities which cause said difference quantity to approach zero, said control means upon completion of a conversion cycle being adapted by its electrical quantity indication to manifest digital values corresponding in combination to the value of said analog signal, detection means coupled to said control means for detecting those combinations of quantities which total greater than nine digits, and means responsive to said detection means for converting said manifested digital values to the 8–4–2–1 binary coded decimal system.

16. An analog-to-digital converter comprising means for comparing an analog input signal with weighted reference standards in sequential steps and selectively retaining and rejecting said reference standards to accumulate a value which differs from said analog input less than any of said reference standards; and means for generating said reference standards in accordance with the inequality:

$$\sum_{x=j}^{N} W_x > T_N - \sum_{x=1}^{j-1} W_x \delta_x$$

where N is the number of comparison steps, $j$ is any comparison step between 1 and N, $W_j$ is the reference standard compared at step $j$ and subsequently retained or rejected, $T_N$ is the true value of the analog signal at the last comparison step, and $\delta_j$ is 1 for a retained standard and 0 for a discarded standard, so that said converter has on at least one of the $j$ comparison steps a tolerance for error $K_j$ defined by equation:

$$K_j=\sum_{x=j+1}^{N} W_x-W_j$$

17. An analog-to-digital converter comprising means for comparing an analog input signal with weighted reference standards in sequential steps and selectively retaining and rejecting said reference standards to accumulate a value which differs from said analog input less than any of said reference standards; means for generating said reference standards in accordance with the inequality:

$$\sum_{x=j}^{N} W_x > T_N - \sum_{x=1}^{j-1} W_x\delta_x$$

where N is the number of comparison steps, $j$ is any comparison step between 1 and N, $W_j$ is the reference standard compared at step $j$ and subsequently retained or rejected, $T_N$ is the true value of the analog signal at the last comparison step, and $\delta_j$ is 1 for a retained standard and 0 for a discarded standard, so that said converter has on at least one of the $j$ comparison steps a tolerance for error $K_j$ defined by equation:

$$K_j=\sum_{x=j+1}^{N} W_x-W_j$$

and means for adding tolerance distributing weights at one or more of said comparison steps.

18. In an analog-to-digital converter in which the apparent analog signal $T_j$ may differ during the conversion from the true value at the end of the conversion $T_N$ by an error factor $X_j$; means for comparing the apparent analog signal $T_j$ with weighted reference standards $W_j$ in sequential steps $j$ and selectively retaining and rejecting said reference standards to accumulate a value which differs from said analog input less than any of said reference standards; a comparator having an output $\delta_j$ where $\delta_j$ is 1 when a standard reference standard is to be retained and is 0 when a reference standard is to be rejected; means for generating a tolerance distributing weight $Y_j$ at step $j$; and means for combining said quantities so that the input to the comparator ($C_j$) is defined by the equation:

$$C_j=T_N+X_j-\sum_{x=1}^{j-1} W_x\delta_x-W_j-Y_j$$

19. In an analog-to-digital converter having a built-in tolerance for error $K_j$, means for generating a plurality of weighted reference standards $W_j$ which are compared with the analog input signal at sequential steps $j$ and retained or rejected so as to accumulate a value which differs from said analog input less than any of said reference standards, means for weighting said standards so as to satisfy the inequality:

$$\sum_{x=j}^{N} W_x > T_N - \sum_{x=1}^{j-1} W_x\delta_x$$

where N is the number of comparison steps, $T_N$ is the true value of the signal at the last comparison step and $\delta_j$ is 1 for a retained standard and 0 for a rejected standard; the built-in tolerance for error of said converter on at least one of the sequential steps $j$ then being defined by equation:

$$K_j=\sum_{x=j+1}^{N} W_x-W_j$$

and means for adding tolerance distributing weights $Y_j$ at step $j$ defined by the equation:

$$Y_j=mK_j$$

where $m$ is a chosen proportion for distributing the error tolerance in a predetermined manner.

20. In an analog-to-digital converter comprising means for comparing an analog input signal with digitally weighted reference standards in sequential steps and selectively retaining and rejecting said reference standards to provide a difference quantity which approaches zero, including a reference standard generator for generating a plurality of reference standards, the total range of said reference standards being divided into a number of separate classes of equal primary subranges and a separate class being subdivided into a number of separate subclasses of equal secondary subranges, the improvement comprising said reference standard generator including at least one error tolerance distributing reference quantity which is included with the reference standards of said separate classes of equal primary subranges when classifying said analog input signal into one of said primary subclasses, means coupled with said reference standard generator and responsive to the retention of a predetermined combination of reference standards totalling greater than a predetermined magnitude in said separate subclasses of equal secondary subranges for causing retention of an additional reference standard in said separate classes of equal primary subranges.

21. In an analog-to-digital converter for comparing an analog input signal with weighted reference standards in sequential steps and selectively retaining and rejecting said reference standards to provide a difference quantity smaller than the reference standard having the smallest weight, the improvement comprising a reference standard generator for generating reference standards in at least first and second decades of decreasing significance, said reference standard generator generating an error tolerance reference quantity in at least said first decade, a sequencer and control means connected with said reference standard generator for selectively retaining and rejecting said reference standards, a comparator connected with said reference standard generator and said sequencer and control means and responsive to said analog input signal and combinations of said reference standards for controlling said sequencer and control means, said sequencer and control means including means responsive to the retention of a predetermined combination of reference standards in said second decade of reference standards for rejecting all reference standards in said second decade totalling greater than a predetermined magnitude and for causing retention of an additional reference standard in said first decade.

22. In an analog-to-digital converter for comparing in sequential steps an analog input signal with reference standards that are weighted according to a number system having a radix, in each of which steps said analog signal is compared to a combination of reference standards and the last added reference standard is selectively retained and rejected so as to provide a difference quantity which approaches zero, the improvement comprising a reference standard generator for generating reference standards in groups, each group including a unity reference standard, the unity reference standard in one group being the radix times the unity reference standard in the next succeeding group, means operable to compare said analog signal first to the combination of an error distributing reference standard and a number of combinations of reference standards of said one group so as to form a group difference signal then to compare said group difference signal in sequential steps with a number of combinations of reference standards of said succeeding group including a zero combination, said last mentioned number of combinations exceeding said radix, and means operable in response to the retaining of reference standards in said succeeding group equaling at least the radix times the unity reference standard in said succeeding group for adding a unity reference standard of said one group to the number of reference standards originally retained in said one group and subtracting the radix times the unity reference standard of said succeeding group from the number of unity reference standards originally retained in said succeeding group.

References Cited by the Examiner

UNITED STATES PATENTS

| | | | |
|---|---|---|---|
| 2,754,503 | 7/56 | Forbes | 340—347 |
| 2,784,396 | 3/57 | Kaiser et al. | 340—347 |
| 2,865,564 | 12/58 | Kaiser et al. | 340—347 |
| 2,994,862 | 8/61 | Preston | 340—347.1 |

FOREIGN PATENTS

| | | |
|---|---|---|
| 812,432 | 4/59 | Great Britain. |

MALCOLM A. MORRISON, *Primary Examiner.*

IRVING L. SRAGOW, *Examiner.*

UNITED STATES PATENT OFFICE

CERTIFICATE OF CORRECTION

Patent No. 3,216,001 November 2, 1965

Karl Hinrichs

It is hereby certified that error appears in the above numbered patent requiring correction and that the said Letters Patent should read as corrected below.

Column 1, line 48, for "had" read -- has --; column 5, line 50, for "compressed" read -- compensated --; column 6, line 7, for "corect" read -- correct --; lines 64 to 66, for that portion of equation (3) reading "j=1" read -- j-1 --; column 8, lines 22 and 23, for that portion of equation (20) reading "$W_x-W_j+$" read -- $W_x+W_j+$ --; lines 34 to 36, for that portion of equation (23) reading "J-1" read -- j-1 --; lines 39 to 41, equation (24) should appear as shown below instead of as in the patent:

$$\sum_{x=1}^{j-1} W_x = W(j-1) + \sum_{x=1}^{j-2} W_x$$

same column 8, line 42, for "24" read -- 23 --; lines 56 to 59, for that portion of equation (28) reading $$\sum_{x=1}^{1} \quad \text{read} \quad \sum_{x=1}^{0}$$

same column 8, lines 61 to 63, equation (29), for "1" over the summation sign read -- 0 --; column 14, line 57, for "converts" read -- converters --; column 18, line 61, for "converted" read -- converter --; column 21, line 52, for "convested 30. Singles" read -- converter 30. Signals --; column 24, line 32, after "converter" insert -- element --; line 51, for "of", first occurrence, read -- and --; column 32, line 20, for "In" read -- An --; lines 27 and 28, for "standand" read -- standards --.

Signed and sealed this 1st day of August 1967.

(SEAL)
Attest:

EDWARD M.FLETCHER,JR.
Attesting Officer

EDWARD J. BRENNER
Commissioner of Patents